US011378295B2

(12) United States Patent
Kami et al.

(10) Patent No.: US 11,378,295 B2
(45) Date of Patent: Jul. 5, 2022

(54) AIR CONDITIONER WITH HEATER PRIORITY MODE AND COMPRESSOR PRIORITY MODE

(71) Applicant: DENSO CORPORATION, Kariya (JP)

(72) Inventors: Yuichi Kami, Kariya (JP); Kengo Sugimura, Kariya (JP); Mitsuo Ooura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/111,882

(22) Filed: Dec. 4, 2020

(65) Prior Publication Data

US 2021/0088246 A1 Mar. 25, 2021

Related U.S. Application Data

(63) Continuation of application No. PCT/JP2019/021951, filed on Jun. 3, 2019.

(30) Foreign Application Priority Data

Jun. 8, 2018 (JP) .............................. JP2018-110426

(51) Int. Cl.
*F24F 11/46* (2018.01)
*F24F 11/64* (2018.01)
(Continued)

(52) U.S. Cl.
CPC ............. *F24F 11/46* (2018.01); *F24F 11/64* (2018.01); *F24F 11/67* (2018.01); *F24F 11/89* (2018.01);
(Continued)

(58) Field of Classification Search
None
See application file for complete search history.

(56) References Cited

U.S. PATENT DOCUMENTS

2004/0079096 A1*  4/2004  Itoh ..................... B60H 1/0075
                                                         62/223
2007/0000266 A1*  1/2007  McEnaney ............. B60H 1/321
                                                         62/228.4

(Continued)

FOREIGN PATENT DOCUMENTS

JP          2010276276      * 12/2010
JP          2017007623 A      1/2017

*Primary Examiner* — Nathan L Laughlin
(74) *Attorney, Agent, or Firm* — Harness, Dickey & Pierce, P.L.C.

(57) ABSTRACT

An air conditioner includes a heat medium circuit, a refrigerant cycle device, a discharge capacity controlling section, a heat generation amount controlling section, a target temperature determining section, and an upper limit determining section. The heat medium circuit includes a heating heat exchanger and an electric heater. The refrigerant cycle device exchanges heat between a heat medium in the heat medium circuit and a refrigerant discharged from an electric compressor. During a heater priority mode, the rotational speed of the compressor is increased to reach an upper limit and a heating amount of the heater is increased as a temperature difference increases. During a compressor priority mode, the heating amount of the heater is decreased and the rotational speed is increased to compensate for a decreasing amount.

20 Claims, 7 Drawing Sheets

(51) Int. Cl.
*F24F 11/67* (2018.01)
*F24F 11/89* (2018.01)
*G05B 19/042* (2006.01)
*F24F 140/60* (2018.01)
*F24F 140/50* (2018.01)
*F24F 130/10* (2018.01)
*F24F 110/10* (2018.01)
*F24F 110/12* (2018.01)
*F24F 140/20* (2018.01)

(52) U.S. Cl.
CPC ........ *G05B 19/042* (2013.01); *F24F 2110/10* (2018.01); *F24F 2110/12* (2018.01); *F24F 2130/10* (2018.01); *F24F 2140/20* (2018.01); *F24F 2140/50* (2018.01); *F24F 2140/60* (2018.01); *G05B 2219/2638* (2013.01)

(56) References Cited

U.S. PATENT DOCUMENTS

| | | | | |
|---|---|---|---|---|
| 2015/0059380 | A1* | 3/2015 | Takayama | F25B 41/22 62/222 |
| 2017/0211833 | A1* | 7/2017 | Tran | F24F 11/30 |
| 2018/0297446 | A1 | 10/2018 | Miyakoshi et al. | |
| 2021/0088243 | A1* | 3/2021 | Goel | F24F 11/43 |

* cited by examiner

AIR CONDITIONER WITH HEATER PRIORITY MODE AND COMPRESSOR PRIORITY MODE

CROSS REFERENCE TO RELATED APPLICATION

The present application is a continuation application of International Patent Application No. PCT/JP2019/021951 filed on Jun. 3, 2019, which designated the U.S. and claims the benefit of priority from Japanese Patent Application No. 2018-110426 filed on Jun. 8, 2018. The entire disclosures of all of the above applications are incorporated herein by reference.

TECHNICAL FIELD

The present disclosure relates to an air conditioner having a refrigeration cycle and a heat medium circuit.

BACKGROUND ART

A vehicle air conditioner has a vapor compression type heat pump cycle (i.e., a refrigeration cycle) and a heat medium circuit (i.e., a cooling water circuit). The vehicle air conditioner uses, as heat sources for heating an air to be blown into the vehicle cabin, a high-temperature high-pressure refrigerant in the refrigeration cycle and a heat medium heated by an electric heater in the heat medium circuit.

SUMMARY

An air conditioner includes a heat medium circuit, a refrigerant cycle device, a discharge capacity controlling section, a heat generation amount controlling section, a target temperature determining section, and an upper limit determining section.

The heat medium circuit includes a heating heat exchanger and an electric heater. The heating heat exchanger is configured to exchange heat between a heat medium and a ventilation air to be blown to an air-conditioning target space. The electric heater is configured to heat the heat medium. The refrigerant cycle device is configured to heat the heat medium in the heat medium circuit by exchanging heat between the heat medium and a high-temperature high-pressure refrigerant discharged from an electric compressor.

The discharge capacity controlling section is configured to control a rotational speed of the electric compressor. The heat generation amount controlling section is configured to control a heating amount generated by the electric heater. The target temperature determining section is configured to determine a target temperature of the heat medium to flow into the heating heat exchanger. The upper limit determining section is configured to determine an upper limit of the rotational speed of the electric compressor.

The air conditioner is configured to switch between a heater priority mode and a compressor priority mode. A difference is calculated by subtracting a current temperature of the heat medium to flow into the heating heat exchanger from the target temperature is defined as a temperature difference. A difference is calculated by subtracting a current rotational speed of the electric compressor from the upper limit is defined as a capacity difference. During the heater priority mode, the discharge capacity controlling section is configured to increase the rotational speed to reach the upper limit and the heat generation amount controlling section is configured to increase the heating amount as the temperature difference increases. During the compressor priority mode, the heat generation amount controlling section is configured to decrease the heating amount generated by the electric heater by a decreasing amount and the discharge capacity controlling section is configured to increase the rotational speed of the electric compressor to compensate for the decreasing amount decreased by the heat generation amount controlling section.

BRIEF DESCRIPTION OF DRAWINGS

The above and other objects, features and advantages of the present disclosure will be more clearly understood from the following detailed description with reference to the accompanying drawings. In the drawings.

DESCRIPTION OF EMBODIMENTS

Figure 1:
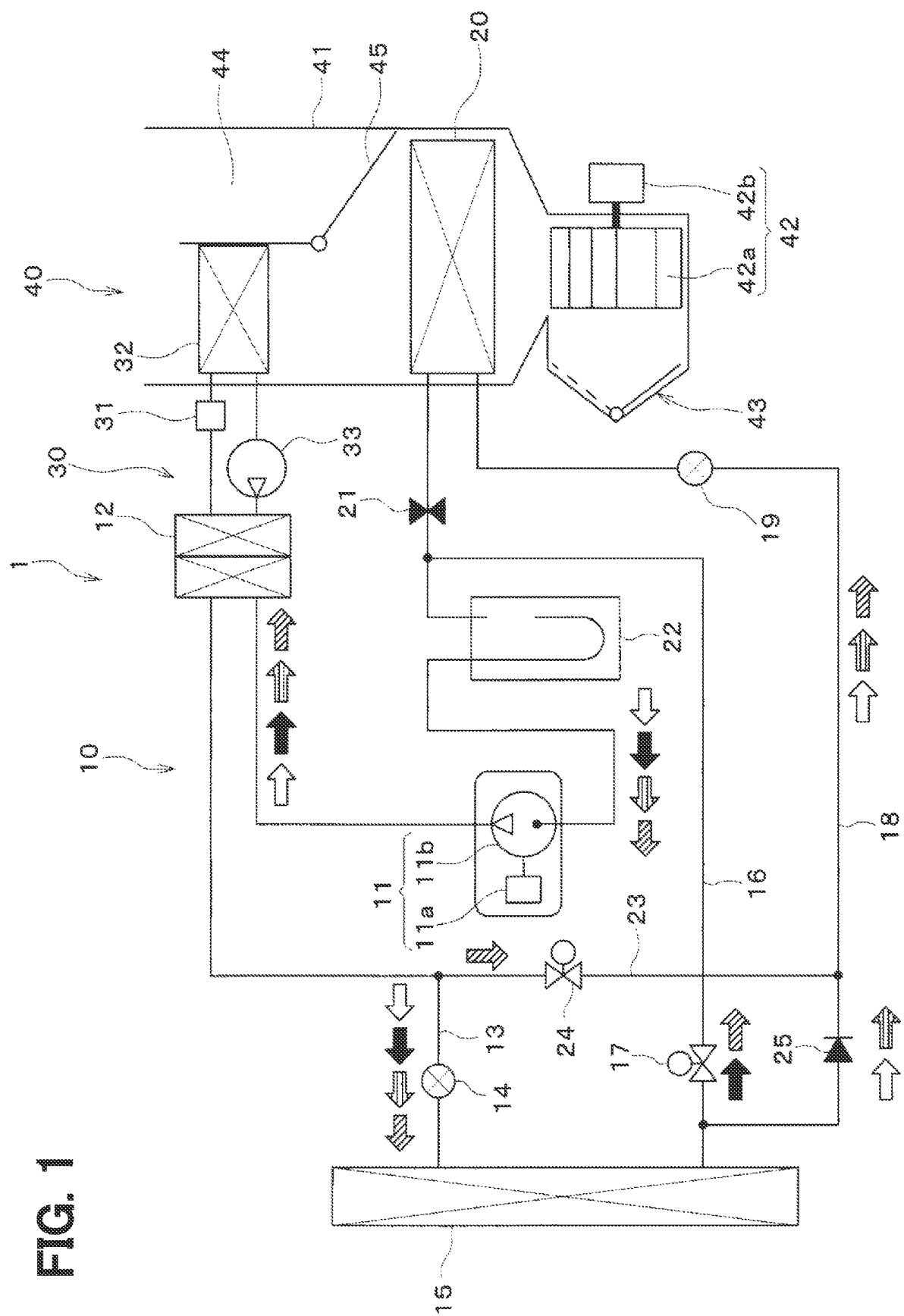
FIG. 1 is a schematic diagram of a vehicle air conditioner in a first embodiment.

To begin with, examples of relevant techniques will be described.

Various inventions have been made with respect to a vehicle air conditioner for conditioning an air in a vehicle cabin. The vehicle air conditioner has a vapor compression type heat pump cycle (i.e., a refrigeration cycle) and a heat medium circuit (i.e., a cooling water circuit).

The vehicle air conditioner uses, as heat sources for heating an air to be blown into the vehicle cabin, a high-temperature high-pressure refrigerant in the refrigeration cycle and a heat medium heated by an electric heater in the heat medium circuit.

The vehicle air conditioner uses the refrigerant cycle device that is more efficient than the electric heater in preference to the electric heater and uses the electric heater as an auxiliary to suppress power consumption during an air-heating.

Here, in the vehicle air conditioner, a compressor of the refrigerant cycle device has a limited capacity for discharging the refrigerant due to noises and the like and its capacity is changed depending on situations. In such a case, if the capacity of the compressor fluctuates in the vehicle air conditioner that uses the electric heater as an auxiliary, the temperature of a ventilation air may fluctuate without following the fluctuation of the capacity of the compressor.

Further, as a result of following the fluctuation of the capacity of the compressor, the electric heater becomes the main heating heat source and the power consumption during the air-heating may increase.

The present disclosure has been made in view of these points and relates to an air conditioner having a refrigeration cycle and a heat medium circuit. It is objective of the present disclosure to provide the air conditioner capable of suppressing fluctuations in a blowing temperature during an air-heating and improving an efficiency of the air-heating.

An air conditioner according to an aspect of the present disclosure includes a heat medium circuit, a refrigerant cycle device, a discharge capacity controlling section, a heat generation amount controlling section, a target temperature determining section, and an upper limit determining section.

The heat medium circuit includes a heating heat exchanger and an electric heater. The heating heat exchanger is configured to exchange heat between a heat medium and a ventilation air to be blown to an air-conditioning target space. The electric heater is configured to heat the heat medium. The refrigerant cycle device is configured to heat the heat medium in the heat medium circuit by exchanging heat between the heat medium and a high-temperature high-pressure refrigerant discharged from an electric compressor.

The discharge capacity controlling section is configured to control a rotational speed of the electric compressor. The heat generation amount controlling section is configured to control a heating amount generated by the electric heater. The target temperature determining section is configured to determine a target temperature of the heat medium to flow into the heating heat exchanger. The upper limit determining section is configured to determine an upper limit of the rotational speed of the electric compressor.

The air conditioner is configured to switch between a heater priority mode and a compressor priority mode. A difference is calculated by subtracting a current temperature of the heat medium to flow into the heating heat exchanger from the target temperature is defined as a temperature difference. A difference is calculated by subtracting a current rotational speed of the electric compressor from the upper limit is defined as a capacity difference. During the heater priority mode, the discharge capacity controlling section is configured to increase the rotational speed to reach the upper limit and the heat generation amount controlling section is configured to increase the heating amount as the temperature difference increases. During the compressor priority mode, the heat generation amount controlling section is configured to decrease the heating amount generated by the electric heater by a decreasing amount and the discharge capacity controlling section is configured to increase the rotational speed of the electric compressor to compensate for the decreasing amount decreased by the heat generation amount controlling section.

That is, the air conditioner can heat the heat medium using, as heat sources, the refrigerant cycle device and the electric heater in the heat medium circuit to heat the ventilation air to flow to the air-conditioning target space through the heating heat exchanger. The air conditioner can heat the ventilation air using multiple heat sources that are refrigerant cycle device and the electric heater and improve a comfortability in the air-conditioning target space.

The air conditioner can switch between the heater priority mode and the compressor priority mode, so that the multiple heat sources can be used appropriately according to situations.

During the heater priority mode, the air conditioner increases the rotational speed of the electric compressor to reach the upper limit and increases the heating amount of the electric heater as the temperature difference increases. Thus, the air conditioner fully uses, as a heat source, the efficient refrigerant cycle device and uses the electric heater to compensate for a lack of heat. Thus, the air-heating in the air-conditioning target space can be performed efficiently.

During the compressor priority mode, the air conditioner decreases the heating amount of the electric heater by a decreasing amount and increase the rotational speed of the electric compressor to compensate for the decreasing amount decreased in the electric heater. Thus, the air conditioner can suppress the fluctuations in total amount of heat added to the heat medium from the multiple heat sources.

That is, the air conditioner can suppress the fluctuations in the blowing temperature of the ventilation air that is heated in the heating heat exchanger by performing the compressor priority mode. The air conditioner increases a heating amount generated in the refrigerant cycle device and decreases the heating amount of the electric heater, so that the efficiency of the air-heating can be improved.

Hereinafter, embodiments for implementing the present disclosure will be described referring to drawings. In the respective embodiments, parts corresponding to matters already described in the preceding embodiments are given reference numbers identical to reference numbers of the matters already described. The same description is therefore omitted depending on circumstances. In the case where only a part of the configuration is described in each embodiment, the other embodiments described above can be applied to the other part of the configuration. The present disclosure is not limited to combinations of embodiments which combine parts that are explicitly described as being combinable. As long as no problem is present, the various embodiments may be partially combined with each other even if not explicitly described.

Hereinafter, embodiments will be described with reference to the drawings. In the following embodiments, identical or equivalent elements are denoted by the same reference numerals as each other in the figures.

First Embodiment

A first embodiment in the present disclosure will be described with reference to FIGS. 1 to 6. FIG. 1 is a schematic diagram of a vehicle air conditioner 1 in the first embodiment.

In the first embodiment, an air conditioner in the present disclosure is applied for the vehicle air conditioner 1 mounted in an electric motor that gains driving force for vehicle traveling from an electric motor. The vehicle air conditioner 1 improves a comfortability in a vehicle cabin that is an air-conditioning target space by performing an air-conditioning in the vehicle cabin.

As shown in FIG. 1, the vehicle air conditioner 1 includes a refrigerant cycle device 10 and a heat medium circuit 30. The refrigerant cycle device 10 of the vehicle air conditioner 1 is configured to selectively cool and heat a ventilation air to be blown into the vehicle cabin that is the air-conditioning target space.

Thus, the refrigerant cycle device 10 is configured to switch between a refrigerant passage in a cooling mode (i.e., a cooling operation) for cooling an air in the vehicle cabin, a refrigerant passage in a dehumidification heating mode (i.e., a dehumidification operation) for dehumidifying and heating the air in the vehicle cabin, and a refrigerant passage in a heating mode (i.e., a heating operation) for heating the air in the vehicle cabin.

Further, the refrigerant cycle device 10 can operate, as the dehumidification heating mode which will be described later, a serial dehumidification mode that is operated in a normal state and a parallel dehumidification mode that is operated when the outside air temperature is lower than that in the serial dehumidification mode.

In the refrigerant cycle device 10, an ordinary fluorocarbon refrigerant is adopted as the refrigerant to constitute a subcritical refrigeration cycle in which a pressure of a high-pressure refrigerant does not exceed a critical pressure of the refrigerant. This refrigerant is mixed with refrigerator oil serving as a lubricant of a compressor 11 that will be described later and the refrigerator oil partially circulates in the cycle together with the refrigerant.

At first, a specific configuration of the refrigerant cycle device 10 in the first embodiment will be described with reference to FIG. 1. The compressor 11 is disposed in an engine compartment (not shown) and configured to draw, compress, and discharge the refrigerant in the refrigerant cycle device 10.

The compressor 11 is constituted as an electric compressor that drives a fixed capacity compression mechanism 11b having a fixed discharge capacity by an electric motor 11a. As the compression mechanism 11b, specifically, various compression mechanisms such as a scroll compression mechanism and a vane compression mechanism can be employed.

The operation (the rotational speed) of the electric motor 11a is controlled by controlling signals transmitted from a controller 50 which will be described later. The electric motor 11a may be either an alternating current motor or a direct current motor. A refrigerant discharge capacity of the compressor 11 is altered by controlling the rotational speed. That is, the rotational speed of the electric motor 11a in the compressor 11 is an index indicating the refrigerant discharge capacity of the compressor 11.

The compressor 11 has an outlet side end fluidly connected to an inlet side end of a water-refrigerant heat exchanger 12. The water-refrigerant heat exchanger 12 is configured to exchange heat between a refrigerant (i.e., a high-temperature high-pressure refrigerant) discharged from the compressor 11 and a heat medium (e.g., a cooling water) circulating through the heat medium circuit 30 to heat the heat medium.

The heat medium circuit 30 includes a heat medium heater 31 and a heater core 32 and a heat of the high-temperature high-pressure refrigerant dissipated to the heat medium is used in the heater core 32 to heat the ventilation air to be supplied into the vehicle cabin. These points will be described later. As the heat medium in the heat medium circuit 30, a solution containing an ethylene glycol, an antifreeze solution, and the like can be employed.

The water-refrigerant heat exchanger 12 has an outlet side end fluidly connected to a first refrigerant passage 13. The first refrigerant passage 13 guides the refrigerant flowing out of the water-refrigerant heat exchanger 12 to an outside heat exchanger 15 which will be described later.

A first expansion valve 14 is disposed in the first refrigerant passage 13. The first expansion valve 14 is an electric variable throttle mechanism and includes a valve body and an electric actuator. The valve body is configured to vary an opening degree of the first refrigerant passage 13 (i.e., the valve body is configured to vary its throttle degree) and the electric actuator includes a stepper motor that varies the throttle degree of the valve body.

The first expansion valve 14 is constituted by a variable throttle mechanism with a full-open function that fully opens the first refrigerant passage 13 when the throttle degree of the first expansion valve 14 is fully opened. That is, the first expansion valve 14 is configured not to decompress the refrigerant by fully opening the first refrigerant passage 13. An operation of the first expansion valve 14 is controlled by controlling signals transmitted from the controller 50.

The first expansion valve 14 has an outlet side end fluidly connected to an inlet side end of the outside heat exchanger 15. The outside heat exchanger 15 is configured to exchange heat between the refrigerant flowing therethrough and an outside air blown by a blowing fan (not shown). The outside heat exchanger 15 serves as an evaporator that exerts a heat absorbing action by evaporating the refrigerant in the heating mode which will be described later and serves as a radiator that radiates a heat of the refrigerant in the cooling mode.

The outside heat exchanger 15 has an outlet side end fluidly connected to a second refrigerant passage 16 and a third refrigerant passage 18 that is branched from the second refrigerant passage 16. The second refrigerant passage 16 is disposed to guide the refrigerant flowing out of the outside heat exchanger 15 to an inlet side end of the compressor 11 through an accumulator 22 which will be described later. The third refrigerant passage 18 is disposed to guide the refrigerant flowing out of the outside heat exchanger 15 to the inlet side end of the compressor 11 through an inside evaporator 20 and the accumulator 22 which will be described later.

As shown in FIG. 1, a first opening-closing valve 17 is disposed in the second refrigerant passage 16 in the first embodiment. The first opening-closing valve 17 is an electromagnetic valve that selectively opens and closes the second refrigerant passage 16 and an operation of the first opening-closing valve 17 is controlled by controlling signals transmitted from the controller 50.

When the first opening-closing valve 17 is opened, a pressure loss generated when the refrigerant flows through the second refrigerant passage 16 is less than a pressure loss generated when the refrigerant flows through the third refrigerant passage 18. The reason is that a check valve 25 and a second expansion valve 19 which will be described later are disposed in the third refrigerant passage 18.

Thus, when the first opening-closing valve 17 is opened, the refrigerant flowing out of the outside heat exchanger 15 flows into the second refrigerant passage 16 and when the first opening-closing valve 17 is closed, the refrigerant flowing out of the outside heat exchanger 15 flows into the third refrigerant passage 18.

The first opening-closing valve 17 is configured to switch a cycle configuration (i.e., the refrigerant passages) by selectively opening and closing the second refrigerant passage 16. Thus, the first opening-closing valve 17 constitutes a refrigerant passage switching portion that switches the refrigerant passages for the refrigerant circulating through the cycle.

The second expansion valve 19 is disposed in the third refrigerant passage 18. Similarly to the first expansion valve 14, the second expansion valve 19 is an electric variable throttle mechanism and includes a valve body and an electric actuator. The valve body is configured to vary an opening degree of the third refrigerant passage 18 (i.e., a throttle degree of the valve body) and the electric actuator has a stepper motor that varies the throttle degree of the valve body.

The variable throttle mechanism of the second expansion valve 19 includes a full-opening function that fully opens the third refrigerant passage 18 by fully opening the throttle degree of the second expansion valve 19 and a full-closing function that fully closes the third refrigerant passage 18 by fully closing the throttle degree of the second expansion valve 19.

That is, the second expansion valve 19 is configured not to decompress the refrigerant and selectively open and close the third refrigerant passage 18. An operation of the second expansion valve 19 is controlled by controlling signals transmitted from the controller 50.

The second expansion valve 19 has an outlet side end fluidly connected to an inlet side end of the inside evaporator 20. As shown in FIG. 1, the inside evaporator 20 is disposed in a casing 41 of an inside air-conditioning unit 40, specifically, at a position upstream of the heater core 32, which will be described later, in a flow direction of the ventilation air in the vehicle cabin.

The inside evaporator 20 is configured to evaporate the refrigerant flowing therethrough by exchanging heat between the refrigerant and the ventilation air before passing through the heater core 32 in the cooling mode and the dehumidification heating mode. That is, the inside evaporator 20 serves as an evaporator that exerts a heat absorbing action to cool the ventilation air.

The inside evaporator 20 has an outlet side end fluidly connected to an inlet side end of an evaporating pressure adjusting valve 21. The evaporating pressure adjusting valve 21 is configured to adjust an evaporating pressure of the refrigerant in the inside evaporator 20 (i.e., a pressure of a low-pressure side refrigerant) to be equal to or greater than a frost generation preventing pressure to prevent the inside evaporator 20 from being covered with a frost. In other words, the evaporating pressure adjusting valve 21 adjusts the refrigerant evaporating temperature in the inside evaporator 20 to be equal to or greater than the predetermined frost generation preventing temperature.

The evaporating pressure adjusting valve 21 has an outlet side end fluidly connected to an inlet side end of the accumulator 22. The accumulator 22 serves as a gas-liquid separator that separates the refrigerant flowing into the accumulator 22 into a gas phase and a liquid-phase and accumulates an excess amount of the refrigerant in the cycle. The accumulator 22 has an outlet for the gas-phase refrigerant fluidly connected to the inlet side end of the compressor 11. Thus, the accumulator 22 restricts the compressor 11 from drawing and compressing the liquid-phase refrigerant.

As shown in FIG. 1, the refrigerant cycle device 10 in the first embodiment includes a bypass passage 23. The bypass passage 23 has one end fluidly connected to a portion of the first refrigerant passage 13 between the outlet side end of the water-refrigerant heat exchanger 12 and the inlet side end of the first expansion valve 14. The other end of the bypass passage 23 is fluidly connected to a portion of the third refrigerant passage 18 between the outlet side end of the outside heat exchanger 15 and the inlet side end of the second expansion valve 19.

Thus, the bypass passage 23 is configured to guide the refrigerant flowing through the portion of the first refrigerant passage 13 between the outlet side end of the water-refrigerant heat exchanger 12 and the inlet side end of the first expansion valve 14 to the portion of the third refrigerant passage 18 between the outlet side end of the outside heat exchanger 15 and the inlet side end of the second expansion valve 19.

In other words, the bypass passage 23 guides the refrigerant flowing out of the water-refrigerant heat exchanger 12 to the inlet side end of the second expansion valve 19 while bypassing the first expansion valve 14 and the outside heat exchanger 15.

A second opening-closing valve 24 is disposed in the bypass passage 23. The second opening-closing valve 24 is an electromagnetic valve that selectively opens and closes the bypass passage 23 and an operation of the second opening-closing valve 24 is controlled by controlling signals transmitted from the controller 50.

The second opening-closing valve 24 is configured to switch the cycle configuration (i.e., the refrigerant passages) by selectively opening and closing the bypass passage 23. That is, the second opening-closing valve 24 constitutes, together with the first opening-closing valve 17, the refrigerant passage switching portion that switches the refrigerant passages of the refrigerant circulating through the cycle.

Further, the check valve 25 is disposed in the third refrigerant passage 18 of the refrigerant cycle device 10. As shown in FIG. 1, the check valve 25 is disposed in a portion of the third refrigerant passage 18 between the outlet side end of the outside heat exchanger 15 and a confluence of the third refrigerant passage 18 and the bypass passage 23.

The check valve 25 allows the refrigerant from flowing from the outlet side end of the outside heat exchanger 15 to the inlet side end of the second expansion valve 19 and prohibits the refrigerant from flowing from the inlet side end of the second expansion valve 19 to the outlet side end of the outside heat exchanger 15. By disposing the check valve 25, the refrigerant flowing into the third refrigerant passage 18 through the bypass passage 23 can be restricted from flowing toward the outside heat exchanger 15.

Next, the heat medium circuit 30 constituting the vehicle air conditioner 1 will be described. The heat medium circuit 30 is configured to circulate the heat medium (e.g., a cooling water). The heat medium circuit 30 includes a circulation cycle including a heat medium passage of the water-refrigerant heat exchanger 12.

Thus, the heat medium circulating through the circulation passage of the heat medium circuit 30 is heated in the water-refrigerant heat exchanger 12 by exchanging heat with the high-pressure refrigerant in the refrigerant cycle device 10. In the circulation cycle of the heat medium circuit 30, the heat medium heater 31, the heater core 32, and a heat medium pump 33 are disposed.

The heat medium passage in the water-refrigerant heat exchanger 12 has an outlet side end that is fluidly connected to an inlet side end of the heat medium passage in the heat medium heater 31. The heat medium heater 31 serves as a heating device that generates heat by being supplied with electricity and heats the heat medium circulating through the heat medium circuit 30. The heat medium heater 31 is so-called an electric heater. The heat medium heater 31 is controlled to generate a desired amount of heat according to an amount of electricity supplied from the controller 50. The heat medium heater 31 serves as the electric heater.

The heat medium passage in the heat medium heater 31 has an outlet side end that is fluidly connected to an inlet side end of the heater core 32. The heater core 32 is disposed in the casing 41 that will be described later. The heater core 32 is configured to exchange the heat medium circulating through the heat medium circuit 30 and the ventilation air flowing through the casing 41 to heat the ventilation air. That is, the heater core 32 is an example of a heating heat exchanger.

The heat medium passage in the heater core 32 has an outlet side end that is fluidly connected to a suction side of the heat medium pump 33. The heat medium pump 33 pumps the heat medium to circulate the heat medium through the circulation passage in the heat medium circuit 30. The heat medium pump 33 is an electric pump such that a rotational speed (i.e., a heat medium pumping capacity) of the heat medium pump 33 is controlled by controlling voltage output from the controller 50.

In the heat medium circuit 30, a discharge side of the heat medium pump 33 is fluidly connected to the inlet side end of the heat medium passage in the water-refrigerant heat exchanger 12. Thus, the heat medium in the heat medium circuit 30 circulates through the heat medium pump 33, the water-refrigerant heat exchanger 12, the heat medium heater 31, the heater core 32, and the heat medium pump 33 in this order when the heat medium pump 33 is operated.

In the vehicle air conditioner 1, the heat medium circuit 30 is configured to heat the heat medium with using, as heat sources, the high-temperature high-pressure refrigerant in the refrigerant cycle device 10 and the heat medium heater 31. The heat medium circuit 30 can heat the ventilation air which will be supplied into the vehicle cabin with a heat of the heat medium in the heat medium circuit 30.

That is, the vehicle air conditioner 1 can heat the ventilation air with using, as heat sources, the refrigerant cycle device 10 and the heat medium heater 31 and improve the comfortability in the vehicle cabin.

Next, the inside air-conditioning unit 40 in the vehicle air conditioner 1 will be described. The inside air-conditioning unit 40 is disposed inside an instrument panel that is located in a foremost side of the vehicle cabin.

The inside air-conditioning unit 40 is configured with the casing 41, a blower 42, the heater core 32, the inside evaporator 20, and the like. The casing 41 forms an outer frame of the inside air-conditioning unit 40 and houses the blower 42, the heater core 32, and the inside evaporator 20. The casing 41 is made of a resin that has a certain degree of elasticity and is superior in strength (i.e., polypropylene) and forms a ventilation passage of the ventilation air supplied into the vehicle cabin.

In the most upstream side of the casing 41 in the flow direction of the ventilation air, an inside-outside air switching device 43 is disposed. The inside-outside air switching device 43 selectively introduces an air in the vehicle cabin (i.e. the inside air) and the outside air into the casing 41.

The inside-outside air switching device 43 defines an inside air introducing opening through which the inside air is introduced into the casing 41 and an outside air introducing opening through which the outside air is introduced into the casing 41. The inside-outside air switching device 43 includes an inside-outside air switching door is disposed. The inside-outside air switching door is configured to continuously adjust an opening area of the inside air introducing opening and the outside air introducing opening and change an amount ratio between the inside air and the outside air.

The blower 42 is disposed at a position downstream of the inside-outside air switching device 43 in the airflow direction. The blower 42 is an electric blower that operates a centrifugal multi-blade fan 32a (i.e., a sirocco fan) with an electric motor 42b and blows an air introduced by the inside-outside air switching device 43 toward the vehicle cabin. A rotational speed (i.e., a ventilation level) of the blower 42 is controlled by controlling signals (i.e., controlling voltage) output from the controller 50 which will be described later.

The inside evaporator 20 and the heater core 32 are disposed in this order at a position downstream of the blower 42 in the airflow direction. In other words, the inside evaporator 20 is located in a position upstream of the heater core 32 in the flow direction of the ventilation air. A cool air bypass passage 44 is defined in the casing 41. The cool air bypass passage 44 guides the air having passed through the inside evaporator 20 to bypass the heater core 32.

An air mix door 45 is disposed at a position downstream of the inside evaporator 20 and upstream of the heater core 32 in the airflow direction. The air mix door 45 is configured to adjust a volume ratio in the air having passed through the inside evaporator 20 between an air flowing through the heater core 32 and an air flowing through the cool air bypass passage 44.

A mixing space is defined in a position downstream of the heater core 32 and the cool air bypass passage 44 in the airflow direction. The air having passed through the heater core 32 and the air having flown through the cool air bypass passage 44 are mixed in the mixing space.

Thus, the air mix door 45 adjusts the volume ratio between the air passing through the heater core 32 and the air flowing through the cool air bypass passage 44, so that the temperature of the ventilation air mixed in the mixing space is adjusted. The air mix door 45 is operated by a servomotor (not shown) that is operated by controlling signals transmitted from the controller 50.

Multiple blowing outlets (not shown) are defined in positions the most downstream of the casing 41 in the flow direction of the ventilation air. Each of the blowing outlets is an opening portion through which the conditioned air mixed in the mixing space is blown toward the vehicle cabin that is the air-conditioning target space.

Specifically, the multiple blowing outlets include a face blowing outlet, a foot blowing outlet, and a defroster blowing outlet. The face blowing outlet is a blowing outlet through which the conditioned air is blown toward an upper body of an occupant in the vehicle cabin. The foot blowing outlet is a blowing outlet through which the conditioned air is blown toward feet of the occupant and the defroster blowing outlet is a blowing outlet through which the conditioned air is blown to an inner surface of a windshield that is disposed in a front side of the vehicle.

Doors are respectively disposed in positions upstream of the face blowing outlet, the foot blowing outlet, and the defroster blowing outlet in the flow direction of the ventilation air. The doors include a face door, a foot door, and a defroster door which are not shown. The face door is a door to adjust an opening area of the face blowing outlet. The foot door is a door to adjust an opening area of the foot blowing outlet and the defroster door to adjust an opening area of the defroster blowing outlet.

The face door, the foot door, and the defroster door constitute a blowing mode switching means to switch the blowing mode and are operated by a servomotor (not shown) through a link mechanism or the like. An operation of the servomotor is controlled by controlling signals transmitted from the controller 50 which will be described later.

Next, a controlling system of the vehicle air conditioner 1 will be described with reference to FIG. 2. The vehicle air conditioner 1 includes the controller 50 for controlling operations of constituent devices. The controller 50 is configured by a known microcomputer including a CPU, a ROM, a RAM, and the like and peripheral circuits of the microcomputer. The controller 50 performs various calculations and processing based on controlling programs stored in the ROM and controls controlled devices connected to an output side of the controller 50. The controller 50 corresponds to a processor.

Figure 2:
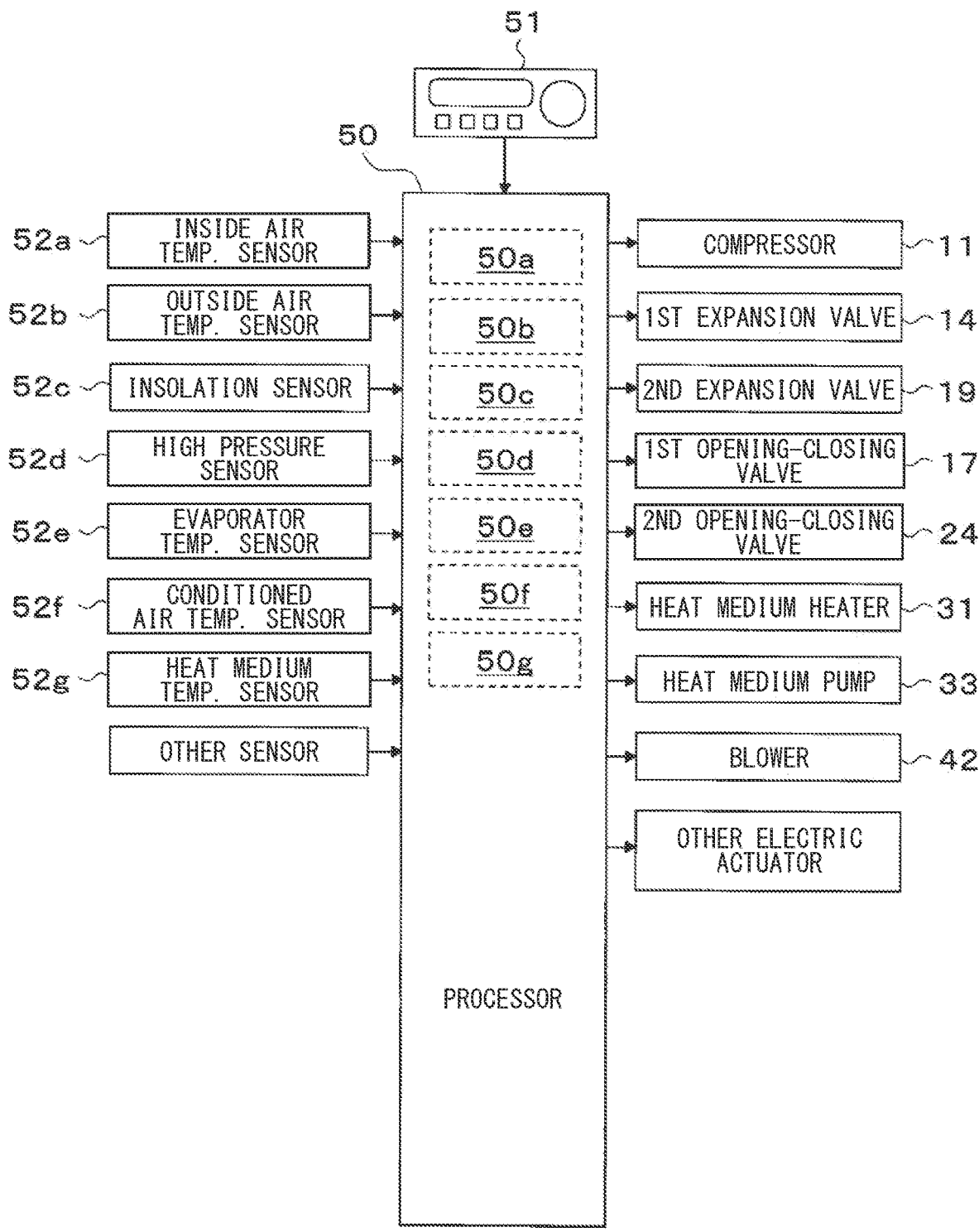
FIG. 2 is a block diagram illustrating a controlling system of the vehicle air conditioner in the first embodiment.

As shown in FIG. 2, multiple sensors for air-conditioning control are connected to an input side of the controller 50. The sensors for air-conditioning control include an inside air temperature sensor 52a, an outside air temperature sensor 52b, an insolation sensor 52c, a high pressure sensor 52d, an evaporator temperature sensor 52e, a conditioned air temperature sensor 52f, and a heat medium temperature sensor 52g.

The inside air temperature sensor 52a is a sensor to detect a temperature Tr in the vehicle cabin. The outside air temperature sensor 52b is a sensor to detect a temperature Tam of the outside air. The insolation sensor 52c is a sensor to detect an insolation amount Ts in the vehicle cabin and the evaporator temperature sensor 52e is a sensor to detect an evaporating temperature (i.e., an evaporator temperature Te) of the refrigerant in the inside evaporator 20.

The conditioned air temperature sensor 52f is a sensor to detect a temperature of the ventilation air (i.e., a blowing temperature TAV) to be blown toward the vehicle cabin from the mixing space. The heat medium temperature sensor 52g is a sensor to detect a temperature of the heat medium (i.e., a heat medium temperature TW) circulating through the heat medium circuit 30 and detects, at an inlet side of the heater core 32, the temperature of the heat medium to flow into the heater core 32.

An operation panel 51 disposed around the instrument panel that is located in the front side of the vehicle cabin is connected to an input side of the controller 50. The operation panel 51 includes various operation switches and operation signals output from the operation switches are input to the controller 50.

The various operation switches disposed in the operation panel 51 specifically include an air-conditioning switch (i.e., NC switch) for setting whether the ventilation air to the vehicle cabin is cooled or not and a temperature setting switch for setting a temperature in the vehicle cabin.

The various controlled devices configuring the vehicle air conditioner 1 are connected to the output side of the controller 50. The controlled devices include the compressor 11, the first expansion valve 14, the second expansion valve 19, the first opening-closing valve 17, the second opening-closing valve 24, the heat medium heater 31, the heat medium pump 33, and the blower 42.

Other electric actuators in FIG. 2 include an electric actuator of the air mix door, an electric actuator of the face door for switching the blowing mode, and the like.

The controller 50 is integrated with control units for controlling the operations of the various controlled devices that are connected to the output side of the controller 50. Configurations (hardware and software) of the controller 50 which control operations of the controlled devices are the control unit controlling the operations of the corresponding controlled devices.

For example, a configuration of the controller 50 that controls a refrigerant discharge capacity of the compressor 11 by controlling the rotational speed of the electric motor 11a of the compressor 11 is a discharge capacity controlling section 50a. A configuration of the controller 50 that controls a heating amount of the heat medium heater 31 by controlling an electricity supplied to the heat medium heater 31 is a heat generation amount controlling section 50b.

A configuration of the controller 50 that determines a target blowing temperature TAO that is a target temperature of the blowing air in a switching control of the operation modes in the vehicle air conditioner 1 is a target temperature determining section 50c.

A configuration of the controller 50 that determines, based on an environment of the vehicle air conditioner 1, an upper limit NcMAX of the rotational speed of the electric motor 11a in the compressor 11 is an upper limit determining section 50d.

The upper limit NcMAX of the rotational speed is an upper limit of the rotational limit that is regulatory determined for controlling the operation of the compressor 11. Thus, the upper limit NcMAX of the rotational speed may be coincide with an allowable limit of the rotational speed that is determined from mechanical elements of the electric motor 11a or may be lower than the allowable limit according to situations.

For example, the upper limit NcMAX of the rotational speed is determined based on a travelling speed of the electric vehicle in which the vehicle air conditioner 1 is mounted and a ventilation volume of the blower 42. When the travelling speed of the electric vehicle falls within a range (i.e., a range from 20 km/h to 80 km/h), the upper limit NcMAX of the rotational speed increases as the travelling speed increases. Since the travelling noise of the electric vehicle increases as the travelling speed increases, the operation noise of the compressor 11 can be masked by the travelling noise.

A configuration of the controller 50 that performs determinations on the refrigerant discharge capacity of the compressor 11 when switching controlling modes in the operation modes and a heat source cooperation mode which will be described later is a discharge capacity determining section 50e.

A configuration of the controller 50 that performs determinations on the heat medium temperature in the heat medium circuit 30 when switching the controlling modes in the operation modes and the heat source cooperation mode which will be described later is a heat medium temperature determining section 50f.

A configuration of the controller 50 that performs determinations of a heating amount of the heat medium heater 31 when switching the controlling modes in the operation modes and the heat source cooperation mode is a heating amount determining section 50g.

Next, an operation of the vehicle air conditioner 1 configured as described above will be described. The vehicle air conditioner 1 in the first embodiment can switch between the cooling mode that cools the vehicle cabin, the heating mode that heats the vehicle cabin, and the dehumidification heating mode that dehumidifies and heats the vehicle cabin.

The dehumidification heating mode of the vehicle air conditioner 1 includes a serial dehumidification mode and a parallel dehumidification mode. The vehicle air conditioner 1 can switch between the serial dehumidification mode and the parallel dehumidification mode as operation modes. The serial dehumidification mode is one of the dehumidification heating modes in which a temperature controllable range of the blowing air into the vehicle cabin falls within a wide range from a low temperature to a high temperature. The parallel dehumidification mode is one of the dehumidification heating modes in which the temperature controllable range of the blowing air into the vehicle cabin falls within a higher range that is higher than the temperature controllable range in the serial dehumidification mode.

The air-heating in the vehicle cabin of the vehicle air conditioner 1 includes a heating mode and a heater heating mode. The heating mode heats the vehicle cabin by using, as heat sources, both the refrigerant cycle device 10 and the heat medium heater 31 and linking the two heat sources. The heater heating mode heats the vehicle cabin by using, as a heat source, the heat medium heater 31.

Switching between the operation modes in the vehicle air conditioner 1 is operated by executing the air-conditioning control programs. The air-conditioning control programs are performed when an auto switch of the operation panel 51 is turned on.

In a main routine of the air-conditioning control programs, detecting signals from the sensors for air-conditioning control and operational signals from the air-conditioning operation switches are read. The target blowing temperature TAO that is a target temperature of the blowing air to be blown into the vehicle cabin is calculated based on a following formula F1 based on the read detecting signals and the operation signals.

$$TAO = Kset \times Tset - Kr \times Tr - Kam \times Tam - Ks \times Ts + C \quad (F1)$$

Tset is a setting temperature in the vehicle cabin set by the temperature setting switch, Tr is the temperature in the vehicle cabin (i.e., the inside air temperature) detected by the inside air temperature sensor 52a, Tam is the temperature of the outside air detected by the outside air temperature sensor 52b, and Ts is the insolation amount detected by the insolation sensor 52c. Kset, Kr, Kam, and Ks are control gains and C is a constant for correction.

The controller 50 determines the appropriate operation mode according to the situations of the vehicle air conditioner 1 from the above-described multiple operation modes with the calculated target blowing temperature TAO, operational signals from the operation panel 51, the outside air temperature Tam detected by the outside air temperature sensor 52b, and the like.

When the cooling switch of the operation panel 51 is turned on and the target blowing temperature TAO is lower than a predetermined cooling standard temperature, the operation mode is determined to be the cooling mode. When the cooling switch of the operation panel 51 is turned on, when the target blowing temperature TAO is equal to or higher than the cooling standard temperature, and when the outside air temperature Tam is higher than a predetermined dehumidification heating standard temperature, the operation mode is determined to be the serial dehumidification mode.

When the cooling switch of the operation panel 51 is turned on, when the target blowing temperature TAO is equal to or higher than the cooling standard temperature, and when the outside air temperature Tam is equal to or lower than the dehumidification heating standard temperature, the operation mode is determined to be the parallel dehumidification mode.

When the outside air temperature Tam is higher than a predetermined operation lowest outside temperature Tam1 and the cooling switch is not turned on, the operation mode is determined to be the heating mode. When the outside air temperature Tam is equal to or lower than the predetermined operation lowest outside temperature Tam1, the operation mode is determined to be the heater heating mode. The operation lowest outside temperature Tam1 is a lower limit of the outside air temperature at which the refrigerant cycle device 10 can exert a heating capacity.

The vehicle air conditioner 1 determines the operation modes as described above. Relationships between the operation modes, the target blowing temperature TAO, and the outside air temperature Tam are illustrated in FIG. 3.

Figure 3:
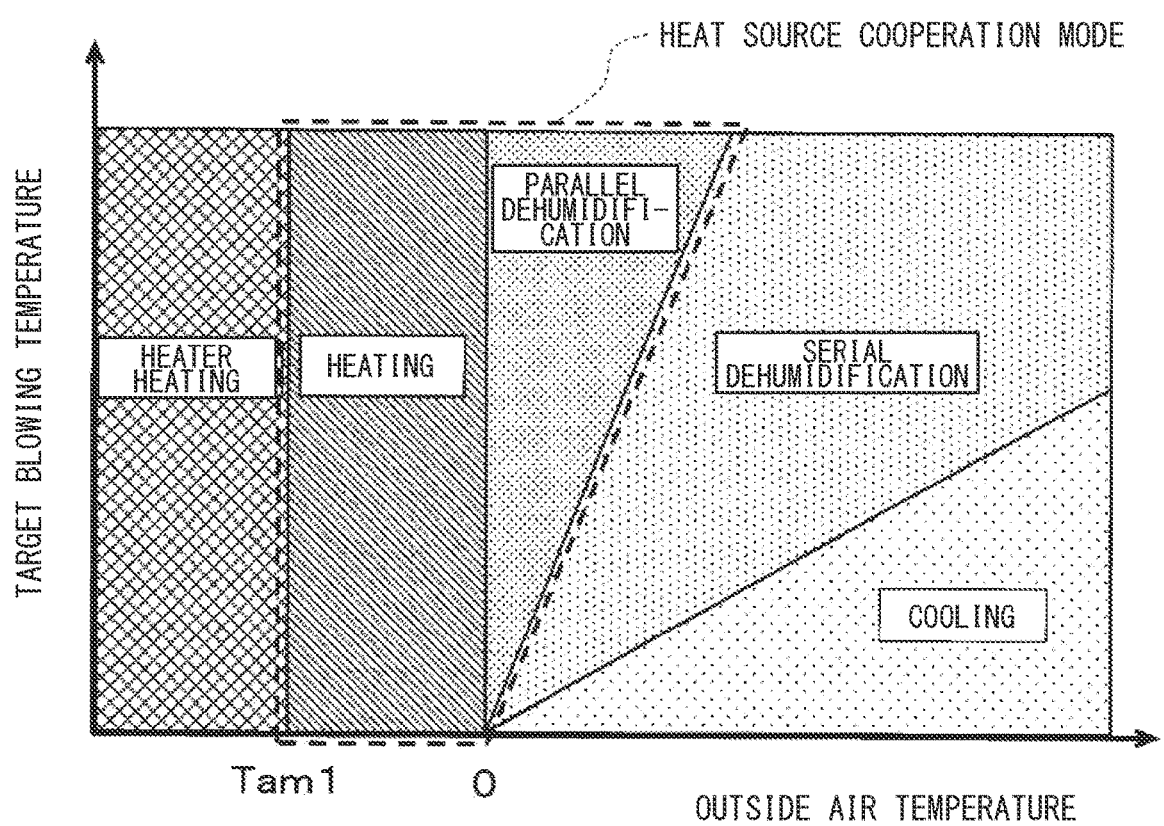
FIG. 3 is a graph illustrating relationships between a target blowing temperature, an outside air temperature, and operation modes of the vehicle air conditioner in the first embodiment.

As shown in FIG. 3, in the vehicle air conditioner 1, the cooling mode is executed when the outside air temperature is relatively high mainly in summer. The serial dehumidification mode is executed mainly in spring or autumn.

The parallel dehumidification mode is executed when the air needs to be heated by a heating capacity that is higher than that in the serial dehumidification mode mainly in early summer and late autumn. The heating mode is executed when the outside air temperature is low mainly in winter and the heater heating mode is executed when the outside air temperature is extremely low (i.e., in an extreme low temperature environment in which the outside temperature is equal to or lower than the operation lowest outside temperature Tam1).

As described above, the vehicle air conditioner 1 can appropriately switch between the heating mode, the cooling mode, the serial dehumidification mode, the parallel dehumidification mode, and the heater heating mode according to an operation environment of the vehicle air conditioner 1.

Next, an operation of the refrigerant cycle device 10 in the heating mode, the cooling mode, the serial dehumidification mode, the parallel dehumidification mode, and the heater heating mode will be described.

(A) Heating Mode

At first, the operation of the refrigerant cycle device 10 in the heating mode will be described. During the heating mode, as described above, the refrigerant cycle device 10 and the heat medium heater 31 are used as heating heat sources and the heat sources are linked.

In the vehicle air conditioner 1, a controlling mode that uses the refrigerant cycle device 10 and the heat medium heater 31 as heating heat sources and links the heat sources is referred to as a heat source cooperation mode. In the heating mode in the first embodiment, the heat source cooperation mode is applied as the controlling mode.

In the heating mode, the controller 50 controls the first opening-closing valve 17 to open the second refrigerant passage 6 and controls the second opening-closing valve 24 to close the bypass passage 23. The throttle of the first expansion valve 14 is reduced and the second expansion valve 19 fully closes the third refrigerant passage 18. As a result, the refrigerant cycle device 10 is switched to configure a refrigerant passage through which the refrigerant circulates as shown in black arrows in FIG. 1.

Thus, the refrigerant cycle device 10 in the heating mode constitute a refrigeration cycle through which the refrigerant circulates through the compressor 11, the water-refrigerant heat exchanger 12, the first expansion valve 14, the outside heat exchanger 15, the first opening-closing valve 17, the accumulator 22, and the compressor 11 in this order.

In this cycle, the controller 50 determines operation states of the controlled devices (i.e., controlling signals output to the controlled devices) based on the target blowing temperature TAO and detecting signals of the sensors. For example, the controlling signals output to the first expansion valve 14 are determined such that a subcooling degree of the refrigerant to flow into the first expansion valve 14 reaches a predetermined target subcooling degree for increasing a coefficient of performance (i.e., COP) of the cycle toward a maximum value.

The controlling signals output to the servomotor of the air mix door 45 is determined such that the air mix door 45 closes the cool air bypass passage 44 and all amount of the ventilation air having passed through the inside evaporator 20 flows through a portion of the ventilation passage in which the heater core 32 is disposed.

As described above, the heating mode is operated in the heat source cooperation mode. Thus, operation control modes of the compressor 11 and the heat medium heater 31 are determined by controlling modes in the heat source cooperation mode. These points are described in detail later.

In the refrigerant cycle device 10 in the heating mode, the water-refrigerant heat exchanger 12 serves as a radiator for the heat medium and the outside heat exchanger 15 serves as an evaporator. The heat of the refrigerant absorbed from the outside air during an evaporation in the outside heat exchanger 15 is released to the heat medium in the water-refrigerant heat exchanger 12. Thus, the ventilation air to be supplied into the vehicle cabin can be heated through the heat medium, so that the vehicle air conditioner 1 in the heating mode can perform the air-heating in the vehicle cabin.

(B) Cooling Mode

Next, an operation of the refrigerant cycle device 10 in the cooling mode will be described. In the cooling mode, an air-cooling in the vehicle cabin is performed by cooling the ventilation air to the vehicle cabin with a cooling heat generated in the refrigerant cycle device 10. The cooling mode in the first embodiment corresponds to a compressor single use mode.

In the cooling mode, the controller 50 controls the first opening-closing valve 17 to close the second refrigerant passage 16 and the second opening-closing valve 24 to close the bypass passage 23. The first expansion valve 14 fully opens the first refrigerant passage 13 and a throttle degree of the second expansion valve 19 is reduced. As a result, the refrigerant cycle device 10 is switched to configure a refrigerant passage through which the refrigerant circulates as shown in white arrows in FIG. 1.

Thus, in the refrigerant cycle device 10 in the cooling mode, the refrigerant circulates through the compressor 11, the outside heat exchanger 15, the check valve 25, the second expansion valve 19, the inside evaporator 20, the evaporating pressure adjusting valve 21, the accumulator 22, and the compressor 11 in this order. When the refrigerant flows from the compressor 11 to the outside heat exchanger 15, the refrigerant flows as it is through the water-refrigerant heat exchanger 12 and the first expansion valve 14.

In this cycle, the controller 50 determines operation states of the controlled devices (i.e., controlling signals output to the controlled devices) based on the target blowing temperature TAO and detecting signals of the sensors.

For example, the refrigerant discharge capacity of the compressor 11 in the cooling mode (i.e., controlling signals output to the electric motor 11a of the compressor 11) is determined in the following manner. At first, the target evaporator blowing temperature TEO of the ventilation air that is blown out of the inside evaporator 20 is determined based on the target blowing temperature TAO with reference to controlling maps stored in the controller 50 in advance.

Then, based on a difference between the target evaporator blowing temperature TEO and the detecting value of the evaporator temperature sensor 52e, controlling signals output to the compressor 11 is determined with a feedback control method such that the temperature of the air passing through the inside evaporator 20 reaches the target blowing temperature.

The controlling signals output to the second expansion valve 19 are determined such that a subcooling degree of the refrigerant to flow into the second expansion valve 19 reaches the predetermined target subcooling degree and the COP reaches the maximum value.

The controlling signals output to the servomotor of the air mix door 45 are determined such that the air mix door 45 closes the portion of the ventilation passage in which the heater core 32 is disposed and the all amount of the ventilation air having passed through the inside evaporator 20 flows through the cool air bypass passage 44. Thus, the ventilation air rarely exchanges heat with the heat medium of the heat medium circuit 30 in the heater core 32 and is supplied to the vehicle cabin after being cooled in the inside evaporator 20.

In the refrigerant cycle device 10 in the cooling mode, the outside heat exchanger 15 serves as a radiator to the outside air and the inside evaporator 20 serves as an evaporator. The refrigerant absorbs heat from the ventilation air when evaporating in the inside evaporator 20, so that the ventilation air is cooled and the absorbed heat is released to the outside air in the outside heat exchanger 15. As a result, the ventilation air to be supplied into the vehicle cabin can be cooled and the vehicle air conditioner 1 in the cooling mode can perform the air-cooling in the vehicle cabin.

(C) Serial Dehumidification Mode

Next, an operation of the refrigerant cycle device 10 in the serial dehumidification mode will be described. The serial dehumidification mode is one of the dehumidification heating mode that cools the ventilation air with the cooling heat generated in the refrigerant cycle device 10, reheats the ventilation air, and supplies the reheated ventilation air into the vehicle cabin.

The serial dehumidification mode has features that the temperature controllable range of the blowing air falls within a wide range from a low temperature to a high temperature. The serial dehumidification mode in the first embodiment corresponds to the compressor single use mode.

In the serial dehumidification mode, the controller 50 controls the first opening-closing valve 17 to close the second refrigerant passage 16 and the second opening-closing valve 24 to close the bypass passage 23. The throttle degrees of the first expansion valve 14 and the second expansion valve 19 are fully closed. As a result, the refrigerant cycle device 10 is switched to configure a refrigerant passage through which the refrigerant circulates as shown in white arrows with horizontal lines in FIG. 1.

Thus, in the refrigerant cycle device 10 in the serial dehumidification mode, the refrigerant circulates through the compressor 11, the water-refrigerant heat exchanger 12, the first expansion valve 14, the outside heat exchanger 15, the check valve 25, the second expansion valve 19, the inside evaporator 20, the evaporating pressure adjusting valve 21, the accumulator 22, and the compressor 11 in this order. That is, the serial dehumidification mode constitutes a cycle in which the outside heat exchanger 15 and the inside evaporator 20 are disposed in series with each other in the flow direction of the refrigerant.

In this cycle, the controller 50 controls the operation of the compressor 11 as with in the cooling mode. The controller 50 controls the air mix door 45 to fully open the portion of the ventilation passage in which the heater core 32 is disposed.

The controller 50 controls the operations of the first expansion valve 14 and the second expansion valve 19 based on the pressure of the refrigerant which is to flow into the first expansion valve 14 such that the COP of the cycle reaches its local maximum value. In this time, the controller 50 reduces the throttle degree of the first expansion valve 14 and increases the throttle degree of the second expansion valve 19 as the target blowing temperature TAO increases.

In the serial dehumidification mode, the water-refrigerant heat exchanger 12 serves as a radiator and the inside evaporator 20 serves as an evaporator. When the saturation temperature of the refrigerant in the outside heat exchanger 15 is higher than the outside air temperature, the outside heat exchanger 15 serves as a radiator. When the saturation temperature of the refrigerant in the outside heat exchanger 15 is lower than that of the outside air, the outside heat exchanger 15 serves as an evaporator.

Thus, when the saturation temperature of the refrigerant in the outside heat exchanger 15 is higher than that of the outside air, the saturation temperature of the refrigerant in the outside heat exchanger 15 is decreased as the target blowing temperature TAO increases to reduce an amount of heat released from the refrigerant in the outside heat exchanger 15. As a result, the amount of heat released from the refrigerant in the water-refrigerant heat exchanger 12 is increased and heating capacity can be increased.

When the saturation temperature of the refrigerant in the outside heat exchanger 15 is lower than that of the outside air, the saturation temperature of the refrigerant in the outside heat exchanger 15 is decreased as the target blowing temperature TAO increases to increase an amount of heat absorbed by the refrigerant in the outside heat exchanger 15. As a result, the amount of heat released from the refrigerant in the water-refrigerant heat exchanger 12 is increased and heating capacity can be increased.

Thus, in the serial dehumidification mode, the air having been cooled and dehumidified in the inside evaporator 20 is reheated through the water-refrigerant heat exchanger 12 and the heat medium circuit 30. Thereby, the dehumidification heating in the vehicle cabin can be performed. Further, the amount of heat released from the refrigerant in the water-refrigerant heat exchanger 12 can be adjusted by adjusting the throttle degrees of the first expansion valve 14 and the second expansion valve 19. Therefore, the temperature of the air to be blown into the vehicle cabin can be adjusted within a wide range from a low temperature to a high temperature.

In the serial dehumidification mode, the amount of heat released from the refrigerant in the water-refrigerant heat exchanger 12 can be adjusted in a wider range than that in a cycle in which the outside heat exchanger 15 serves as either one of a radiator or an evaporator. The serial dehumidification mode can expand the temperature controllable range of the blowing air to be blown into the air-conditioning target space in the dehumidification operation.

(D) Parallel Dehumidification Mode

Next, an operation of the refrigerant cycle device 10 in the parallel dehumidification mode will be described. The parallel dehumidification mode is one of the dehumidification heating mode in which the ventilation air having been cooled with a cooling heat generated in the refrigerant cycle device 10 is reheated and supplied into the vehicle cabin.

The parallel dehumidification mode has features that the temperature controllable range of the blowing air is higher than that in the serial dehumidification mode. In the parallel dehumidification mode, both of the refrigerant cycle device 10 and the heat medium heater 31 are cooperatively used as heat sources for reheating the ventilation air that has been cooled. That is, the heat source cooperation mode is employed as the controlling mode in the serial dehumidification mode in the first embodiment as with the heating mode.

In the parallel dehumidification mode, the controller 50 controls the first opening-closing valve 17 to open the second refrigerant passage 16 and the second opening-closing valve 24 to open the bypass passage 23. Both of the throttle degrees of the first expansion valve 14 and the second expansion valve 19 are reduced. As a result, the refrigerant cycle device 10 switches to configure a refrigeration passage through which the refrigerant circulates as shown in white arrows with diagonal lines in FIG. 1.

In the refrigerant cycle device 10 in the parallel dehumidification mode, the refrigerant circulates through the compressor 11, the water-refrigerant heat exchanger 12, the first expansion valve 14, the outside heat exchanger 15, the first opening-closing valve 17, the accumulator 22, and the compressor 11 in this order. At the same time, in the parallel dehumidification mode, the refrigerant also circulates through the compressor 11, the water-refrigerant heat exchanger 12, the second opening-closing valve 24, the second expansion valve 19, the inside evaporator 20, the evaporating pressure adjusting valve 21, the accumulator 22, and the compressor 11 in this order. That is, the parallel dehumidification mode forms a cycle in which the outside heat exchanger 15 and the inside evaporator 20 are disposed in parallel with each other in the flow direction of the refrigerant.

In this cycle, the controller 50 determines operation states of the controlled devices (i.e., controlling signals output to the controlled devices) based on the target blowing temperature TAO and detecting signals of the sensors.

For example, the controller 50 controls the operations of the first expansion valve 14 and the second expansion valve 19 based on the pressure of the refrigerant which is to flow into the first expansion valve 14 such that the COP of the cycle reaches the local maximum value.

In this time, the controller 50 reduces the throttle degree of the first expansion valve 14 and increases the throttle degree of the second expansion valve 19 as the target blowing temperature TAO increases. The controller 50 displaces the air mix door 45 to fully open the portion of the ventilation passage in which the heater core 32 is disposed.

As described above, the parallel dehumidification mode is operated in the heat source cooperation mode as with the heating mode. Thus, the operation control modes of the compressor 11 and the heat medium heater 31 are determined by the controlling mode in the heat source cooperation mode. These points will be described in detail later.

In the parallel dehumidification mode, the water-refrigerant heat exchanger 12 serves as a radiator and the outside heat exchanger 15 and the inside evaporator 20 serve as evaporators. Thus, the saturation temperature of the refrigerant in the outside heat exchanger 15 is decreased as the target blowing temperature TAO increases to increase the amount of heat absorbed by the refrigerant in the outside heat exchanger 15. As a result, the amount of heat released from the refrigerant in the water-refrigerant heat exchanger 12 is increased and heating capacity can be increased.

In the parallel dehumidification mode, the air having been cooled and dehumidified in the inside evaporator 20 is reheated in the heater core 32 through the water-refrigerant heat exchanger 12 and the heat medium circuit 30. Thereby, the dehumidification heating in the vehicle cabin can be performed.

Further, the saturation temperature of the refrigerant in the outside heat exchanger 15 (i.e., an evaporating temperature) can be lower than the saturation temperature of the refrigerant in the inside evaporator 20 (i.e., the evaporating temperature). Therefore, the parallel dehumidification mode can increase the amount of heat released by the refrigerant in the water-refrigerant heat exchanger 12 to a value that is greater than that in the serial dehumidification mode. As a result, the heating capacity of the ventilation air is more increased in the parallel dehumidification mode than in the serial dehumidification mode.

(E) Heater Heating Mode

Here, a heater heating mode that is one of the operation modes in the vehicle air conditioner 1 will be described. When the outside air temperature Tam is equal to or lower than the operation lowest outside temperature Tam1 (i.e., the vehicle air conditioner 1 is in the extreme low temperature environment), the refrigerant cycle device 10 cannot absorb heat sufficiently from the outside air in the low-pressure side. That is, it is difficult for the refrigerant cycle device 10 to perform the air-heating efficiently with heat of the high-temperature high-pressure refrigerant.

Therefore, when the outside air temperature Tam is equal to or lower than the operation lowest outside temperature Tam1, the vehicle air conditioner 1 executes the heater heating mode in which the ventilation air is heated using, as a heat source, the heat medium heater 31 of the heat medium circuit 30 without using the refrigerant cycle device 10. The heater heating mode corresponds to a heater single use mode.

When the outside air temperature Tam is higher than the operation lowest outside temperature Tam1, the operation mode is switched to the appropriate operation mode according to the driving environment of the vehicle air conditioner 1 as described above.

In the heater heating mode, the controller 50 determines the operation states of the controlled devices (i.e., controlling signals output to the controlled devices) based on the target blowing temperature TAO, the detecting signals of the sensors, and the like. Specifically, the output of the heat medium heater 31 (i.e., the heating amount) is determined based on the target heat medium temperature TWO and the heat medium temperature TW that is a temperature of the heat medium to flow into the heater core 32.

The target heat medium temperature TWO is determined by reading, from the ROM of the controller 50, controlling maps that are predetermined based on the target blowing temperature TAO and referring to the control maps.

The output of the heat medium heater 31 is determined using a feedback control method based on the difference between the target heat medium temperature TWO and the detecting value of the heat medium temperature sensor 52g. Thus, the output of the heat medium heater 31 is determined such that the heat medium temperature TW of the heat medium which is to flow into the heater core 32 reaches the target heat medium temperature TWO.

As a result, the vehicle air conditioner 1 in the heater heating mode can heat the heat medium using, as a heat source, the heat medium heater 31 and perform the air-heating in the vehicle cabin through the heater core 32.

Next, the controlling mode in the heat source cooperation mode in the first embodiment will be described with reference to FIG. 4. As described above, the vehicle air conditioner 1 employs the heat source cooperation mode in which both the refrigerant cycle device 10 and the heat medium heater 31 are cooperatively used as heat sources for the air-heating in the heating mode and the parallel dehumidification mode.

The heat source cooperation mode includes a combination use mode, a compressor priority mode, and a heater priority mode. These modes in the heat source cooperation mode differ at controlling modes of the compressor 11 in the refrigerant cycle device 10 and the heat medium heater 31 in the heat medium circuit 30.

(1) Combination Use Mode

At first, features of the combination use mode will be described. In the combination use mode, the refrigerant cycle device 10 and the heat medium heater 31 are similarly used as heat sources. The amount of heat released to the heat medium from the refrigerant cycle device 10 is controlled by controlling the rotational speed Nc of the electric motor 11a of the compressor 11.

Specifically, the rotational speed Nc of the compressor 11 in the combination use mode is determined with a feedback control method using the difference between the target heat medium temperature TWO described above and the current heat medium temperature TW that is specified by the detecting value of the heat medium temperature sensor 52g.

The rotational speed Nc of the compressor 11 in the combination use mode is determined such that the current heat medium temperature TW reaches the target heat medium temperature TWO. That is, the greater the difference between the target heat medium temperature TWO and the current heat medium temperature TW is, the higher the rotational speed Nc of the compressor 11 is set to be.

The output of the heat medium heater 31 in the combination use mode is determined with a feedback control method using the difference between the target heat medium temperature TWO and the current heat medium temperature TW that is specified by the detecting value of the heat medium temperature sensor 52g.

The output of the heat medium heater 31 in the combination use mode is set such that the current heat medium temperature TW reaches the target heat medium temperature TWO. That is, the greater the difference between the target heat medium temperature TWO and the current heat medium temperature TW is, the greater the output of the heat medium heater 31 is set to be.

In the combination use mode, both of the compressor 11 in the refrigerant cycle device 10 and the heat medium heater 31 in the heat medium circuit 30 are controlled with the feedback control methods using the difference between the target heat medium temperature TWO and the current heat medium temperature TW.

Therefore, in the combination use mode, the refrigerant cycle device 10 and the heat medium heater 31 are controlled such that the heat medium temperature TW in the heat medium circuit 30 reaches the target heat medium temperature TWO as soon as possible. The combination use mode is a controlling mode that quickly raises the heating capacity in the vehicle air conditioner 1 and secures an immediate effect on the heating of the ventilation air.

(2) Compressor Priority Mode

Next, features of the compressor priority mode will be described. In the compressor priority mode, the operation controls of the compressor 11 in the refrigerant cycle device 10 and the heat medium circuit 30 are different from that in the combination use mode.

During the compressor priority mode, the output of the heat medium heater 31 is decreased by a decreasing amount and the operation of the compressor 11 in the refrigerant cycle device 10 is controlled to compensate for the decreasing amount of the output of the heat medium heater 31.

Figure 5:
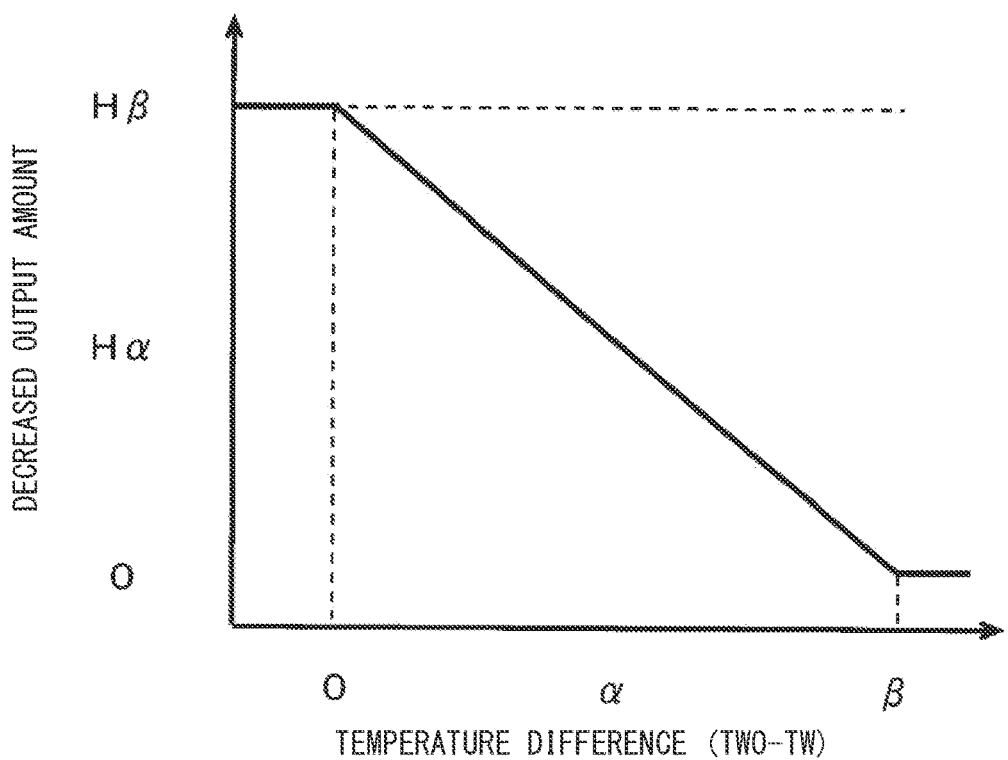
FIG. 5 is a control characteristic diagram used in determining an output decreasing amount of a heater in a compressor priority mode.

Specifically, during the compressor priority mode, the controller 50 specifies the decreasing amount of the output of the heat medium heater 31 based on the difference between the target heat medium temperature TWO and the current heat medium temperature TW using a control map shown in FIG. 5.

In the control map in FIG. 5, as for the temperature difference between the target heat medium temperature TWO and the current heat medium temperature TW, $\alpha$ and $\beta$ satisfy a relationship $0<\alpha<\beta$. As for the decreasing amount of the output of the heat medium heater 31, $H\alpha$ and $H\beta$ satisfy a relationship $0<H\alpha<H\beta$. That is, the smaller the difference between the target heat medium temperature TWO and the current heat medium temperature TW is, the greater the decreasing amount of the output of the heat medium heater 31 is set to be.

The controller 50 calculates an increasing and decreasing amount of the output of the heat medium heater 31 with a feedback control method using the difference between the target heat medium temperature TWO and the current heat medium temperature TW specified by the detecting value of the heat medium temperature sensor 52g.

During the compressor priority mode, the controller 50 determines a minimum value between the decreasing amount of the heat medium heater 31 specified with the control map in FIG. 5 and the increasing and decreasing amount of the output of the heat medium heater 31 calculated by the feedback control method. The controller 50 determines the minimum value as an actual decreasing amount of the heat medium heater 31.

During the compressor priority mode in the vehicle air conditioner 1, the minimum value between the decreasing amount of the heat medium heater 31 specified with the control map in FIG. 5 and the increasing and decreasing amount of the output of the heat medium heater 31 calculated by the feedback control method is used. As a result, the compressor priority mode can cope with a case in which the target blowing temperature TAO is largely changed by a user operating the operation panel 51.

Next, during the compressor priority mode, the controller 50 calculates an increasing decreasing amount of the rotational speed Nc of the compressor 11 with a feedback control method using the difference between the target heat medium temperature TWO and the current heat medium temperature TW specified by the detecting value of the heat medium temperature sensor 52g. The controller 50 corrects, using a rotational speed correction amount corresponding to the actual decreasing amount of the output of the heat medium heater 31 described above, the increasing decreasing amount of the rotational speed Nc of the compressor 11 that is specified with the feedback control method.

Figure 6:
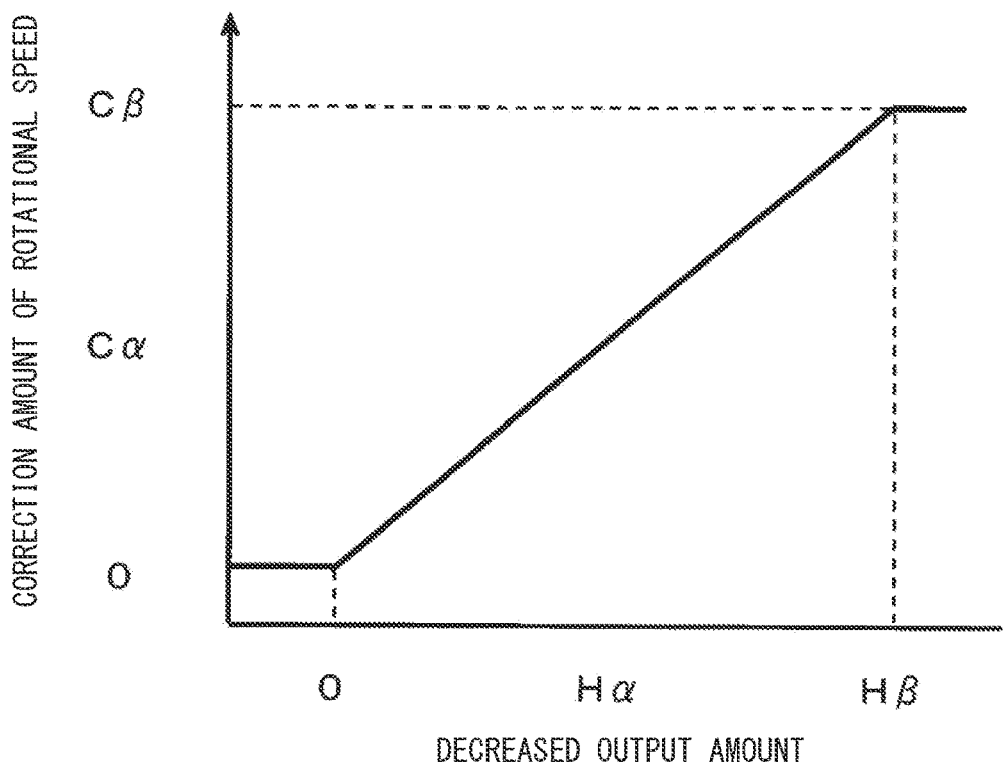
FIG. 6 is a control characteristic diagram used in determining a correction amount of a rotational speed in the compressor priority mode.

Specifically, the controller 50 refers to the decreasing amount of the heat medium heater 31 that has been determined and a control map in FIG. 6 when determining the rotational speed correction amount of the compressor 11. In the control map in FIG. 6, as for the decreasing amount of the heat medium heater 31, $H\alpha$ and $H\beta$ satisfy a relationship $0<H\alpha<H\beta$ as with FIG. 5. As for the rotational speed correction amount, $C\alpha$ and $C\beta$ satisfy a relationship $0<C\alpha<C\beta$.

In the control map in FIG. 6, the rotational speed correction amount is determined such that the decreasing amount of the heat of the heat medium heater 31 can be covered by the compressor 11. That is, in the control map in FIG. 6, the heat amount corrected by the rotational speed correction amount and added to the heat medium is equivalent to the decreasing amount of the heat medium heater 31 used for calculating the rotational speed correction amount.

During the compressor priority mode, the controller 50 determines an actual increasing decreasing amount of the rotational speed by adding the rotational speed correction amount specified with the control map in FIG. 6 to the increasing decreasing amount of the rotational speed Nc of the compressor 11 calculated with the feedback control method. The control in the compressor priority mode is periodically executed at predetermined intervals.

That is, by using the control maps shown in FIGS. 5 and 6 during the compressor priority mode, the decreasing amount of the heat medium heater 31 is decreased as the temperature difference between the target heat medium temperature TWO and the current heat medium temperature TW increases.

Therefore, the vehicle air conditioner 1 in the compressor priority mode can maintain the total amount of heat added to the heat medium in the heat medium circuit 30 and adjust a balance between the heat amount in the refrigerant cycle device 10 and the heat amount in the heat medium heater 31.

As a result, the compressor priority mode can suppress a fluctuation in the heat medium temperature TW in the heat medium circuit 30 and a fluctuation in the blowing temperature in the heating mode and the parallel dehumidification mode.

The compressor priority mode can increase a capacity ratio of the refrigerant cycle device 10 in the heating capacity of the vehicle air conditioner 1 and decrease a capacity ratio in the heating capacity of the vehicle air conditioner 1 by executing controls described above. Since the refrigerant cycle device 10 has a better COP than the heat medium heater 31, a power consumption in the heating and parallel dehumidification of the vehicle air conditioner 1 can be reduced.

During the compressor priority mode, a responsiveness of the feedback control for the rotational speed Nc of the compressor 11 against a load fluctuations such as a fluctuation in the ventilation volume of the blower 42 can be secured by executing the controls described above. The compressor priority mode can keep a good controllability of the temperature of the heat medium in the heat medium circuit 30.

When the heat medium temperature TW tends to decrease in the compressor priority mode, the decreasing amount of the output of the heat medium heater 31 can be set to be small. Also in this case, the increasing decreasing amount of the rotational speed is determined to compensate for the decreasing amount of the output of the heat medium heater 31, so that fluctuations in the heat medium temperature and the blowing temperature can be suppressed.

(3) Heater Priority Mode

Next, features of the heater priority mode will be described. During the heater priority mode, the compressor 11 of the refrigerant cycle device 10 is controlled to keep a predetermined operation state and the heating capacity is finely adjusted by controlling the operation of the heat medium heater 31.

Specifically, during the heater priority mode, the controller 50 controls the operation of the compressor 11 such that the rotational speed Nc of the compressor 11 becomes to be the upper limit NcMAX of the rotational speed that is determined by the upper limit determining section 50d. As for the operation control of the compressor 11, the controller 50 may prohibit from deceasing the rotational speed Nc of the compressor 11.

In the heater priority mode, the controller 50 determines the output of the heat medium heater 31 with a feedback control method using a difference between the target heat medium temperature TWO and the current heat medium temperature TW specified by the detecting value of the heat medium temperature sensor 52g.

At this time, the controller 50 adjusts the output of the heat medium heater 31 such that a power consumption of the heat medium heater 31 is equal to or less than a value calculated by subtracting a power consumption of the compressor 11 from an allowable electricity for air-conditioning in the electric vehicle.

During the heater priority mode, a required heating capacity is secured by adjusting the output of the heat medium heater 31 while the refrigerant cycle device 10, which is superior in the COP, is preferentially operated in a maximum capacity under a limitation of the allowable electricity for air-conditioning in the electric vehicle. That is, in the heater priority mode, the vehicle air conditioner 1 can sufficiently enhance the heating efficiency under the operating environment of the vehicle air conditioner 1.

Next, switching conditions of the controlling modes in the heat source cooperation mode will be described in detail with reference to drawings.

The heat source cooperation mode includes three controlling modes that are the combination use mode, the compressor priority mode, and the heater priority mode as described above. At first, the switching conditions to the combination use mode will be described.

Figure 4:
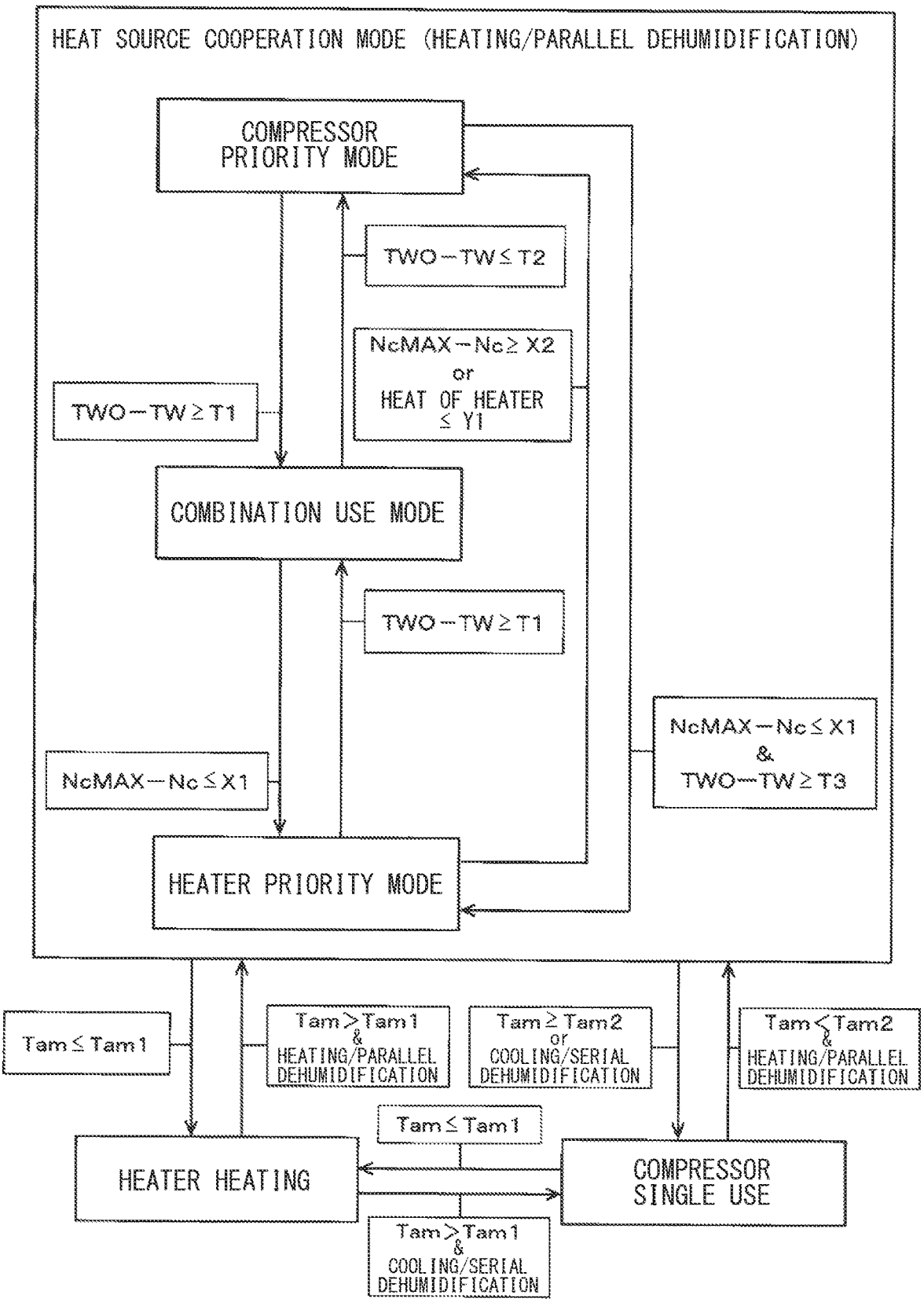
FIG. 4 is an explanatory diagram illustrating switching conditions between the operation modes in the first embodiment.

As shown in FIG. 4, the switching condition to the combination use mode is that the temperature difference of the heat medium is equal to or greater than a predetermined specific temperature difference T1. The temperature difference of the heat medium is defined as a temperature difference between the target heat medium temperature TWO and the current heat medium temperature TW. The heat medium temperature determining section 50f of the controller 50 determines whether the switching condition is satisfied or not.

Thus, when the temperature difference of the heat medium is equal to or higher than the specified temperature difference T1 during the compressor priority mode, the controlling mode is switched to the combination use mode. Similarly, when the temperature difference of the heat medium is equal to or higher than the specified temperature difference T1 during the heater priority mode, the controlling mode is switched to the combination use mode.

The switching condition indicates that a total heating capacity of the vehicle air conditioner 1 is significantly insufficient for a desired state defined by the target heat medium temperature TWO. At this time, the controlling mode is switched to the combination use mode, so that multiple heat sources of the refrigerant cycle device 10 and the heat medium heater 31 are controlled with the feedback control method using the temperature difference of the heat medium.

During the combination use mode, the vehicle air conditioner 1 can make the desired state using the multiple heat sources (i.e., the refrigerant cycle device 10 and the heat medium heater 31) as soon as possible and quickly improve the comfortability in the vehicle cabin.

As a concrete scene in which the switching condition to the combination use mode is satisfied, initial stages of the heating and the parallel dehumidification operation in the vehicle air conditioner 1 are considered. In this case, the current heat medium temperature TW can quickly approach the target heat medium temperature TWO by controlling the compressor 11 and the heat medium heater 31 in the combination use mode and using both the refrigerant cycle device 10 and the heat medium heater 31, which contributes to a quick heating.

Next, switching conditions from the combination use mode to the compressor priority mode will be described. When the temperature difference of the heat medium is equal to or lower than a predetermined standard temperature difference T2 during the combination use mode, the controlling mode in the heat source cooperation mode is switched to the compressor priority mode.

The standard temperature difference T2 is less than the specific temperature difference T1 described above. The heat medium temperature determining section 50f of the controller 50 determines whether the switching condition is satisfied or not.

The switching condition indicates a standard whether the desired state, which is defined by the target heat medium temperature TWO, is achieved to some extent by using both the refrigerant cycle device 10 and the heat medium heater 31.

When the combination use mode is switched to the compressor priority mode in the condition where the desired state is achieved to some extent, the heat amount balance between the refrigerant cycle device 10 and the heat medium heater 31 can be adjusted while keeping the total heat amount in the vehicle air conditioner 1.

During the compressor priority mode, the heating amount of the heat medium heater 31 is gradually decreased and a heating amount of the refrigerant cycle device 10 which is more efficient than the heat medium heater 31 is increased. Thus, a heating efficiency in the heating and the parallel dehumidification mode can be gradually increased.

Next, switching condition from the heater priority mode to the compressor priority mode will be described.

At first, when a capacity difference of the compressor is equal to or greater than a predetermined standard capacity difference X2 during the heater priority mode, the controlling mode in the heat source cooperation mode is switched to the compressor priority mode. The capacity difference of the compressor is defined as a difference between the upper limit NcMAX of the rotational speed of the compressor 11 and a current rotational speed of the compressor 11.

The switching condition indicates that the compressor 11 has a certain amount of capacity in the heater priority mode. The discharge capacity determining section 50e of the controller 50 determines whether the switching condition is satisfied or not.

In the heater priority mode, the compressor 11 is controlled such that the rotational speed Nc is set to be the upper limit NcMAX determined by the upper limit determining section 50d. As a condition in which the capacity difference of the compressor becomes a value equal to or larger than the standard capacity difference X2 under such condition, a case in which the upper limit NcMAX of the compressor 11 is altered to increase by the upper limit determining section 50d is considered.

For example, when the upper limit NcMAX of the compressor 11 is determined according to a traveling speed of the electric vehicle and when the traveling speed is increased to be a certain speed during the heater priority mode, the upper limit determining section 50d determines to increase the upper limit NcMAX. In this case, the switching condition described above may be satisfied as the upper limit NcMAX increases.

In this situation, since there is a room in operating the compressor 11, the refrigerant cycle device 10 can be further utilized as a heating heat source. Thus, the controlling mode is switched to the compressor priority mode to improve the heating efficiency in the heating operation and the parallel dehumidification operation.

During the compressor priority mode, the output of the heat medium heater 31 is gradually decreased by a decreasing amount and the rotational speed of the compressor 11 is gradually increased to compensate for the decreasing amount of the heat medium heater 31. Thus, the compressor 11 is not stopped by a pressure protection control that is executed when the rotational speed of the compressor 11 is sharply increased. As a result, the fluctuations in the blowing temperature in the heating and the parallel dehumidification operation can be suppressed.

Another switching condition from the heater priority mode to the compressor priority mode will be described. The switching condition is that the heating amount of the heat medium heater 31 is equal to or less than a standard value Y1 during the heater priority mode. The heating amount determining section 50g of the controller 50 determines whether the switching condition is satisfied or not.

The switching condition indicates a state in which most of the heat amount for the desired state based on the target blowing temperature TAO is covered by the heat amount of the refrigerant cycle device 10.

Under this condition, the heating amount of the heat medium heater 31 is further reduced and the reduced heating amount is covered by the refrigerant cycle device 10. Thereby, the refrigerant cycle device 10 that has the better COP is preferentially used and the heating efficiency in the heating and dehumidification operation can be improved.

Next, switching conditions from the combination use mode to the heater priority mode will be described. When the capacity difference of the compressor is equal to or less than a predetermined specific capacity difference X1 during the combination use mode, the controlling mode is switched to the heater priority mode. The specific capacity difference X1 is less than the standard capacity difference X2 described above, for example.

That is, the switching condition indicates a state where the heating capacity of the refrigerant cycle device 10 has been sufficiently demonstrated within a range determined by the upper limit determining section 50d in the combination use mode.

When the controlling mode is switched to the heater priority mode under this situation, the rotational speed of the compressor 11 is controlled to reach the upper limit NcMAX and the output of the heat medium heater 31 is controlled according to a lack of heat amount.

That is, the refrigerant cycle device 10 that has a good COP can be fully utilized and the heat medium heater 31 is supplementary utilized. Therefore, the heating capacity of the vehicle air conditioner 1 can be improved by switching the combination use mode to the heater priority mode.

Next, switching conditions from the compressor priority mode to the heater priority mode will be described. When the capacity difference of the compressor 11 is equal to or less than the specific capacity difference X1 during the compressor priority mode and when the temperature difference of the heat medium is equal to or greater than a predetermined value T3 during the compressor priority mode, the controlling mode is switched to the heater priority mode.

As described above, since the switching conditions include that the capacity difference of the compressor 11 is equal to or greater than the specific capacity difference X1, the heating capacity of the refrigerant cycle device 10 has been already utilized to some extent.

One of the switching conditions is that the temperature difference of the heat medium is equal to or greater than the predetermined value T3. The predetermined value T3 is less than the specific temperature difference T1 and the standard temperature difference T2.

That is, the switching condition as for the temperature difference of the heat medium indicates a state where the current heat medium temperature TW is not enough for the target heat medium temperature TWO and the heating capacity in the compressor priority mode dose not satisfy a requirement to reach the target heat medium temperature TWO.

In such a situation, by switching to the heater priority mode, the vehicle air conditioner 1 can fully use the refrigerant cycle device 10 that has a good COP and satisfy the required heating capacity for the target heat medium temperature TWO by operating the heat medium heater 31. As a result, the vehicle air conditioner 1 can satisfy the required heating capacity based on the target blowing temperature TAO and improve the heating efficiency.

Here, the vehicle air conditioner 1 can switch between the heat source cooperation mode including the heating operation and the parallel dehumidification operation and other operation modes. As shown in FIG. 4, the other operation modes include a heater heating mode and a compressor single use mode (i.e., the cooling mode and the parallel dehumidification mode).

Switching conditions from the heat source cooperation mode to the heater heating mode include that the outside air temperature Tam detected by the outside air temperature sensor 52b is equal to or less than the predetermined operation lowest outside temperature Tam1. The operation lowest outside temperature Tam1 is a lower limit of the outside air temperature Tam for operating the refrigerant cycle device 10 as a heating heat source. The operation lowest outside temperature Tam1 is determined based on a configuration of the refrigerant cycle device 10, kinds of the refrigerant, and the like.

When the outside air temperature Tam is equal to or less than the operation lowest outside temperature Tam1, it is difficult to use the refrigerant cycle device 10 as a heating heat source. Thus, the heat source cooperation mode of the vehicle air conditioner 1 is switched to the heater heating mode and the required heating capacity based on the target blowing temperature TAO is satisfied by the heat medium heater 31.

When the outside air temperature Tam is equal to or less than the operation lowest outside temperature Tam1 during the compressor single use mode (e.g., the cooling mode or the serial dehumidification mode), the compressor single use mode is switched to the heater heating mode. In this case, it is difficult to use the refrigerant cycle device 10 for the air-heating. Thus, constituent devices of the vehicle air conditioner 1 are operated based on the target blowing temperature TAO without operating the refrigerant cycle device 10.

When the outside air temperature Tam is higher than the operation lowest outside temperature Tam1 during the heater heating mode, the operation mode is switched according to a relationship between the target blowing temperature TAO and the outside air temperature Tam shown in FIG. 3. When the heating mode or the parallel dehumidification mode is chosen based on the target blowing temperature TAO and the outside air temperature Tam, the heater heating mode is switched to the heat source cooperation mode.

In this case, it is possible to use the refrigerant cycle device 10 as a heating heat source. Thus, both the refrigerant cycle device 10 and the heat medium heater 31 can be used in the heating mode or the parallel dehumidification mode to improve the heating efficiency.

When the outside air temperature Tam is higher than the operation lowest outside temperature Tam1 and when the cooling mode or the serial dehumidification mode is chosen based on the target blowing temperature TAO and the outside air temperature Tam, the heater heating mode is switched to the cooling mode or the serial dehumidification mode.

In this case, in the cooling mode or the serial dehumidification mode, the comfortability in the vehicle cabin is improved by adjusting a temperature of the ventilation air to be the target blowing temperature TAO.

Next, switching conditions from the heat source cooperation mode to the compressor single use mode will be described. The compressor single use mode adjusts the temperature of the ventilation air by operating the refrigerant cycle device 10 without operating the heat medium heater 31. Thus, the compressor single use mode includes the cooling mode and the serial dehumidification mode described above and further includes a mode in which the cycle is operated for the heating or parallel dehumidification while stopping the operation of the heat medium heater 31.

As shown in FIG. 4, the switching condition includes that the outside air temperature Tam is equal to or greater than a predetermined standard outside air temperature Tam2. The standard outside air temperature Tam2 in the first embodiment is determined based on the target blowing temperature TAO and the outside air temperature Tam detected by the outside air temperature sensor 52b. The standard outside air temperature Tam2 is higher than the operation lowest outside temperature Tam1.

Specifically, when the outside air temperature Tam is equal to or greater than the standard outside air temperature Tam2 during the heat source cooperation mode or when the cooling mode or the serial dehumidification mode is chosen based on the target blowing temperature TAO and the outside air temperature Tam, the operation mode is switched to the compressor single use mode.

In the compressor single use mode, the vehicle air conditioner 1 can adjust the temperature of the ventilation air based on the target blowing temperature TAO with the refrigerant cycle device 10, so that the comfortability in the vehicle cabin can be efficiently improved.

Next, switching conditions from the compressor single use mode to the heat source cooperation mode will be described. The switching condition is that the outside air temperature Tam is lower than the standard outside air temperature Tam2 during the compressor single use mode and the heating mode and that the parallel dehumidification mode is specified based on the target blowing temperature TAO and the outside air temperature Tam.

In this case, by switching to the heat source cooperation mode, the vehicle air conditioner 1 can effectively use both the refrigerant cycle device 10 and the heat medium heater 31 as heating heat sources during the heating mode or the parallel dehumidification mode.

As described above, the vehicle air conditioner 1 in the first embodiment controls the switching of the refrigerant passages in the refrigerant cycle device 10 and controls the operation of the constituent devices in the heat medium circuit 30 to perform the cooling mode, the serial dehumidification mode, the parallel dehumidification mode, the heating mode, and the heater heating mode. The vehicle air conditioner 1 can perform a comfortable air-conditioning in the vehicle cabin with the operation modes described above.

The vehicle air conditioner 1 in the first embodiment can heat the heat medium using, as the heating heat sources, both the refrigerant cycle device 10 and the heat medium heater 31 of the heat medium circuit 30 during the heating mode and the parallel dehumidification mode. Thus, the ventilation air into the vehicle cabin can be heated through the heater core 32. That is, the vehicle air conditioner 1 can heat the ventilation air using multiple heating heat sources of the refrigerant cycle device 10 and the heat medium heater 31 and improve a comfortability in the vehicle cabin.

The vehicle air conditioner 1 can switch between the heater priority mode and the compressor priority mode during the heating mode and the parallel dehumidification mode to appropriately use the multiple heating heat sources according to the situations.

During the heater priority mode, the vehicle air conditioner 1 increases the rotational speed Nc of the compressor 11 to reach the upper limit NcMAX and increase the heating amount of the heat medium heater 31 with the feedback control method based on the temperature difference between the target blowing temperature TAO and the current temperature of the heat medium heater 31.

Thus, the vehicle air conditioner 1 can fully use the refrigerant cycle device 10 that has a good COP as a heating heat source and use the heat medium heater 31 for a lack of the heat amount, so that the air-heating or the parallel dehumidification in the vehicle cabin can be effectively achieved.

The vehicle air conditioner 1 decreases the heating amount of the heat medium heater 31 by a decreasing amount and increases the rotational speed Nc of the compressor 11 to compensate for the decreasing amount decreased in the heat medium heater 31. Thereby, the vehicle air conditioner 1 can suppress fluctuations in the total amount of heat added to the heat medium from the multiple heat sources of the refrigerant cycle device 10 and the heat medium heater 31.

That is, the vehicle air conditioner 1 can restrict fluctuations in the blowing temperature of the ventilation air that is heated through the heat exchange with the heat medium in the heater core 32 by executing the compressor priority mode. Additionally, the vehicle air conditioner 1 increases the heating amount generated by the refrigerant cycle device 10 and decreases the heating amount generated by the heat medium heater 31, so that the efficiency of the heating operation can be improved.

The vehicle air conditioner 1 determines the decreasing amount decreased by the heat medium heater 31 during the compressor priority mode such that the decreasing amount decreases as the temperature difference between the target heat medium temperature TWO and the current heat medium temperature TW increases as shown in FIGS. 5 and 6.

Thus, the vehicle air conditioner 1 can appropriately decrease the heating amount of the heat medium heater 31 according to a temperature of the heat medium in the heat medium circuit 30, so that the vehicle air conditioner 1 can quickly decrease the heating amount of the heat medium heater 31 and increase the heating amount of the refrigerant cycle device 10.

As a result, when the temperature difference of the heat medium is large and the blowing temperature does not reach the target temperature, the vehicle air conditioner 1 decreases the decreasing amount of the heat of the heat medium 31 and increases the rotational speed of the compressor 11 with the feedback control method. That is, the lack of the heating capacity is covered by preferentially operating the refrigerant cycle device 10 that has a good COP and the efficiency of the heating operation can be improved while suppressing the temperature fluctuations.

As shown in FIG. 4, when the capacity difference of the compressor 11 is equal to or greater than the standard capacity difference X2 during the heater priority mode of the vehicle air conditioner 1, the heater priority mode is switched to the compressor priority mode.

In this case, the rotational speed Nc of the compressor 11 has a sufficient capacity relative to the upper limit NcMAX. Thus, by decreasing the output of the heat medium heater 31 and increasing the heating amount of the refrigerant cycle device 10 during the compressor priority mode, the efficient heating can be achieved while suppressing the fluctuations in the blowing temperature.

When the heating amount of the heat medium heater 31 is equal to or less than the standard value Y1 during the heater priority mode of the vehicle air conditioner 1, the heater priority mode is switched to the compressor priority mode.

In this case, the required heating amount based on the target heat medium temperature TWO is sufficiently covered by the refrigerant cycle device 10. Thus, the vehicle air conditioner 1 switches the controlling mode to the compressor priority mode to suppress the fluctuations in the blowing temperature and improve the heating efficiency.

When the capacity difference of the compressor 11 is equal to or less than the specific capacity difference X1 during the compressor priority mode and when the temperature difference of the heat medium is equal to or higher than the predetermined value T3 during the compressor priority mode, the vehicle air conditioner 1 is operated in the heater priority mode.

That is, when the heating capacity of the refrigerant cycle device 10 has been already utilized to some extent and the heating capacity in the compressor priority mode does not satisfy the requirement, the vehicle air conditioner 1 switches the controlling mode to the heater priority mode. As a result, the vehicle air conditioner 1 fully uses the refrigerant cycle device 10 that has a good COP and operates the heat medium heater 31 to satisfy the required heating capacity for the target heat medium temperature TWO. The vehicle air conditioner 1 can improve the heating efficiency while satisfying the required heating capacity based on the target blowing temperature TAO.

When the temperature difference of the heat medium is equal to or higher than the specific temperature difference T1 during the heat source cooperation mode, the vehicle air conditioner 1 is operated in the combination use mode. During the combination use mode, the compressor 11 is controlled to increase the rotational speed Nc as the temperature difference of the heat medium increases and the heat medium heater 31 is controlled to increase the heating amount as the temperature difference of the heat medium increases.

When the temperature difference is equal to or greater than the specific temperature difference T1 in this state, the total heating capacity of the vehicle air conditioner 1 is significantly insufficient from the required amount determined by the target heat medium temperature TWO. The vehicle air conditioner 1 uses both the refrigerant cycle device 10 and the heat medium heater 31 and quickly increases the heating capacity of the vehicle air conditioner 1 to reach the desired state by switching to the combination use mode.

When the temperature difference of the heat medium is equal to or less than the standard temperature difference T2 during the combination use mode of the vehicle air conditioner 1, the controlling mode is switched to the compressor priority mode. When such condition is satisfied, the heating capacity of the vehicle air conditioner 1 satisfies the desired state to some extent during the combination use mode.

In this state, by switching to the compressor priority mode, the vehicle air conditioner 1 can adjust a heating amount balance between the refrigerant cycle device 10 and the heat medium heater 31 and improve the heating efficiency while keeping the total amount of the heat generated in the vehicle air conditioner 1.

When the capacity difference of the compressor 11 is equal to or less than the specific capacity difference X1 during the combination use mode of the vehicle air conditioner 1, the controlling mode is switched to the heater priority mode. In this state, the compressor 11 sufficiently displays its capacity within the range determined by the upper limit determining section 50d and the heating capacity of the refrigerant cycle device 10 is sufficiently utilized.

In this state, by switching to the heater priority mode, the vehicle air conditioner 1 can fully utilize the refrigerant cycle device 10 that has a good COP and supplementary uses the heat medium heater 31, so that the heating efficiency of the vehicle air conditioner 1 can be improved.

When at least the outside air temperature Tam is equal to or greater than the predetermined standard outside temperature Tam2, the vehicle air conditioner 1 is operated in the compressor single use mode. During the compressor single use mode, the operation of the compressor 11 is controlled in a state where the heat medium heater 31 is stopped to heat the heat medium and the temperature of the ventilation air is adjusted with the refrigerant cycle device 10.

During the compressor single use mode, the vehicle air conditioner 1 can adjust the temperature of the ventilation air according to the target blowing temperature TAO with the refrigerant cycle device 10, so that the comfortability in the vehicle cabin can be efficiently improved.

When the outside air temperature Tam is equal to or lower than the operation lowest outside temperature Tam1, the controlling mode of the vehicle air conditioner 1 is switched to the heater heating mode. During the heater heating mode, the heat medium heater 31 is controlled to heat the heat medium while the compressor 11 is stopped.

Thus, when the refrigerant cycle device 10 cannot be used as a heating heat source due to a relationship with the outside air temperature, the vehicle air conditioner 1 can heat the ventilation air with the heat medium heater 31 for the air-heating in the vehicle cabin.

Second Embodiment

Next, a second embodiment that is different from the first embodiment will be described with reference to drawings.

The vehicle air conditioner 1 in the second embodiment, similarly to the first embodiment, include the refrigerant cycle device 10, the heat medium circuit 30, the inside air-conditioning unit 40, the controller 50, and the like.

The vehicle air conditioner 1 in the second embodiment differs from that in the first embodiment at the cycle configuration of the refrigerant cycle device 10. Other portions in the second embodiment are similar to those in the first embodiment, thus the descriptions thereof are omitted and differences from the first embodiment will be concretely described. In the following description, the same reference signs as those of the first embodiment designate identical elements, and the preceding description will be referred to.

Figure 7:
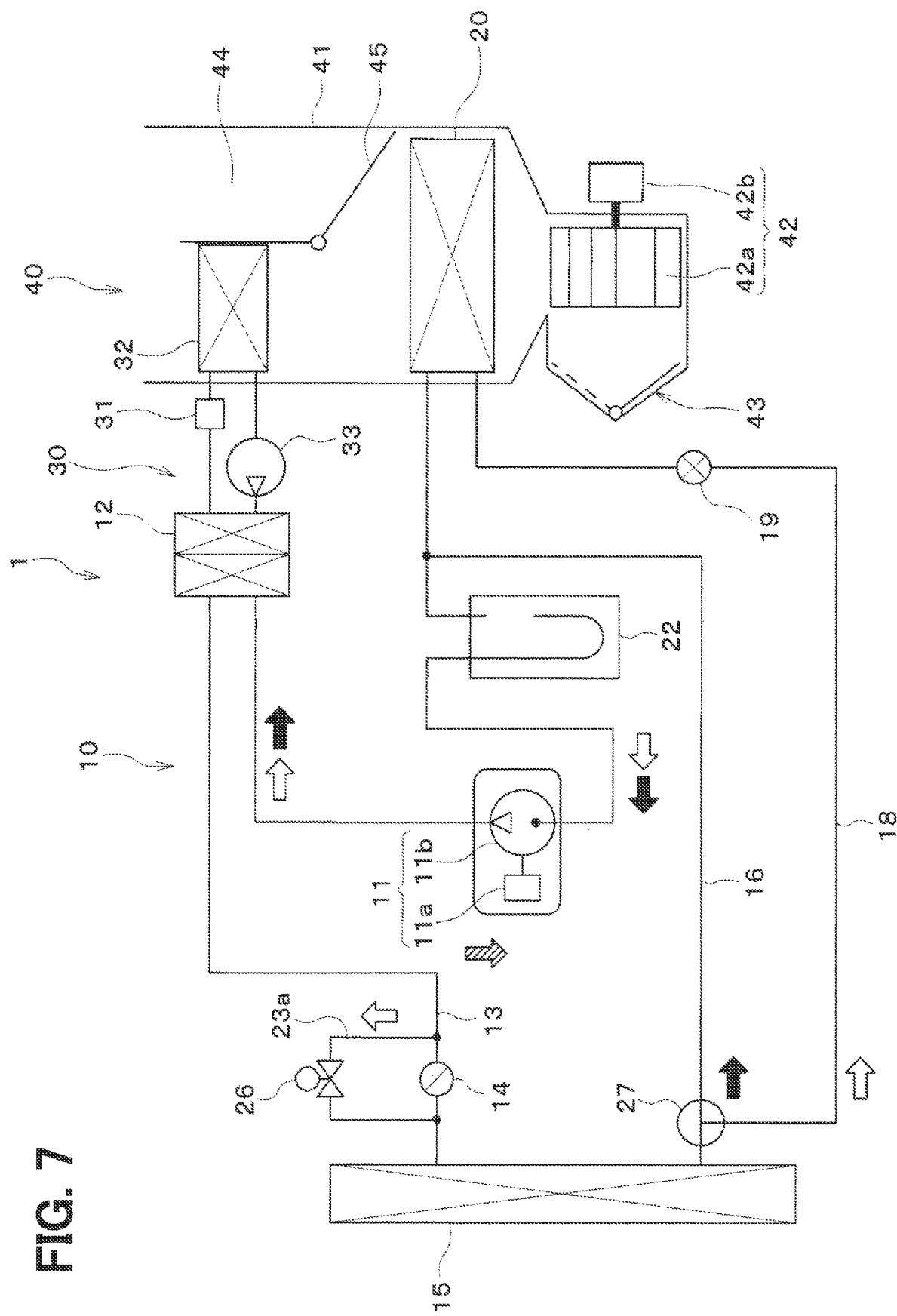
FIG. 7 is a schematic diagram of a vehicle air conditioner in a second embodiment.

As shown in FIG. 7, the refrigerant cycle device 10 in the vehicle air conditioner 1 in the second embodiment does not include the bypass passage 23 and the second opening-closing valve 24, which is different from that in the first embodiment. Thus, in the second embodiment, the outside heat exchanger 15 and the inside evaporator 20 are not connected in parallel with each other in the flow direction of the refrigerant.

The first refrigerant passage 13 of the second embodiment includes a bypass passage 23a and a third opening-closing valve 26. The bypass passage 23a has one end branched from a portion between the outlet side end of the water-refrigerant heat exchanger 12 and the inlet side end of the first expansion valve 14 and the other end joining to a portion between the outlet side end of the first expansion valve 14 and the inlet side end of the outside heat exchanger 15.

That is, the bypass passage 23a guides the refrigerant from the water-refrigerant heat exchanger 12 to the outside heat exchanger 15 with bypassing the first expansion valve 14. The third opening-closing valve 26 is an electromagnetic valve to selectively open and close the bypass passage 23a and an operation of the third opening-closing valve 26 is controlled by controlling signals transmitted from the controller 50.

An inlet side end of a three-way valve 27 is fluidly connected to the outlet side end of the outside heat exchanger 15 unlike the first embodiment. One of outlet side ends of the three-way valve 27 is fluidly connected to the second refrigerant passage 16 and the other one of the outlet side ends of the three-way valve 27 is fluidly connected to the third refrigerant passage 18.

An operation of the three-way valve 27 is controlled by the controlling signals transmitted from the controller 50 and the three-way valve 27 is configured to guide the refrigerant having flown out of the outside heat exchanger 15 to either one of the second refrigerant passage 16 and the third refrigerant passage 18. That is, in the second embodiment, the first expansion valve 14 with fully closing function, the third opening-closing valve 26, and the three-way valve 27 constitute the refrigerant passage switching portion.

In the second embodiment, the second refrigerant passage 16 does not include the first opening-closing valve 17. The third refrigerant passage 18 does not include the check valve 25. Other portions are similar to those in the first embodiment and have been already described, thus descriptions thereof will be omitted.

Figure 8:
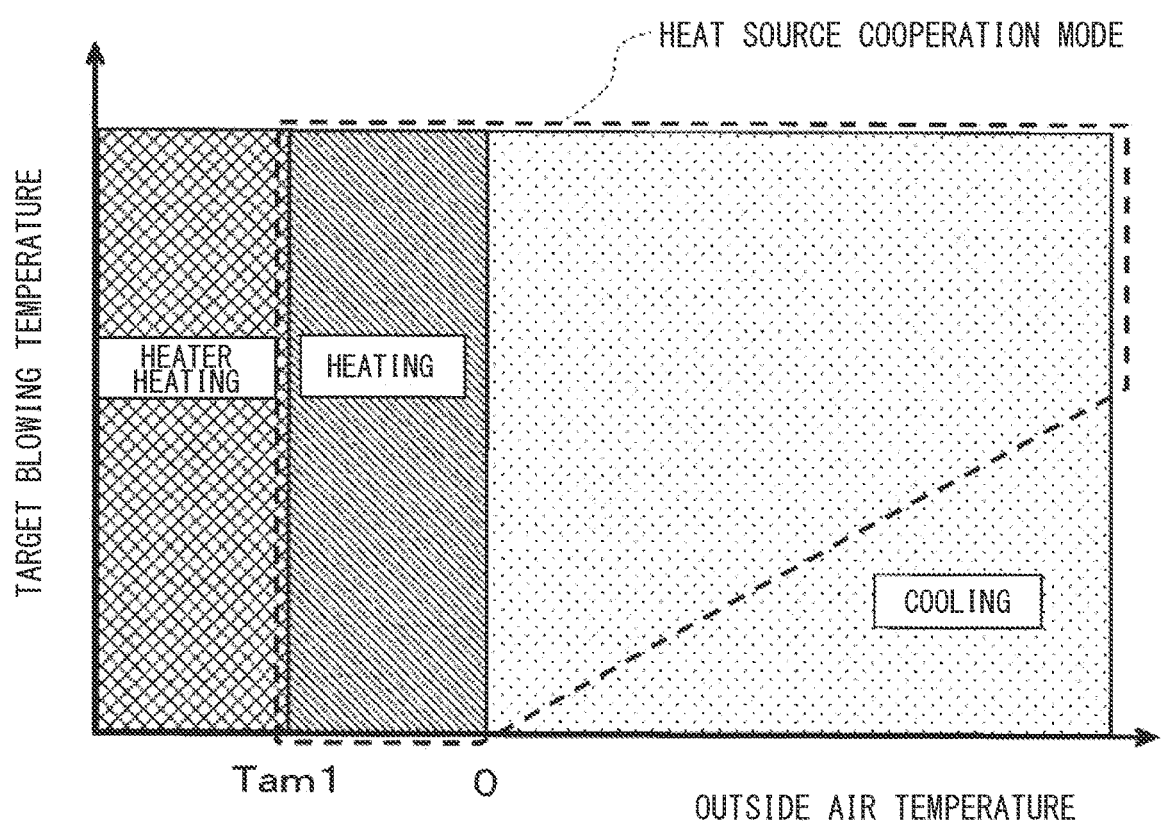
FIG. 8 is a graph illustrating relationships between the target blowing temperature, the outside air temperature, and the operation modes of the vehicle air conditioner in the second embodiment.

As shown in FIG. 8, the vehicle air conditioner 1 in the second embodiment can switch between the cooling mode, the heating mode, and the heater heating mode as operation modes. Specifically, the vehicle air conditioner 1 can switch between the heating mode and the cooling mode by controlling the first expansion valve 14, the third opening-closing valve 26, and the three-way valve 27.

At first, during the heating mode in the second embodiment, both of the refrigerant cycle device 10 and the heat medium heater 31 are used in cooperation as heating heat sources similarly to the first embodiment.

In the heating mode in the second embodiment, the controller 50 controls the operations of the first expansion valve 14, the third opening-closing valve 26, and the three-way valve 27 to switch to and configure a refrigerant passage through which the refrigerant circulates as shown in black arrows in FIG. 7.

The refrigerant cycle device 10 in the heating mode in the second embodiment constitutes a cycle through which the refrigerant circulates through the compressor 11, the water-refrigerant heat exchanger 12, the first expansion valve 14, the outside heat exchanger 15, the three-way valve 27, the accumulator 22, and the compressor 11 in this order. In this case, the water-refrigerant heat exchanger 12 serves as a radiator to the heat medium and the outside heat exchanger 15 serves as a heat absorber from the outside air.

In the heating mode in the second embodiment, similarly to the first embodiment, the heat source cooperation mode is employed by controlling the compressor 11 of the refrigerant cycle device 10 and the heat medium heater 31. The controlling mode in the heat source cooperation mode includes the combination use mode, the compressor priority mode, and the heater priority mode and these controlling modes are switched one another under the same switching conditions in the first embodiment.

During the cooling mode in the second embodiment, the controller 50 controls the operations of the first expansion valve 14, the third opening-closing valve 26, and the three-way valve 27 to switch to and configure a refrigerant passage through which the refrigerant circulates as shown in white arrows in FIG. 7.

In the refrigerant cycle device 10 in the cooling mode in the second embodiment, the refrigerant circulates through the compressor 11, the water-refrigerant heat exchanger 12, the third opening-closing valve 26, the outside heat exchanger 15, the three-way valve 27, the second expansion valve 19, the inside evaporator 20, the accumulator 22, and the compressor 11 in this order. In this case, the water-refrigerant heat exchanger 12 and the outside heat exchanger 15 serve as radiators respectively to the heat medium and the outside air and the inside evaporator 20 serves as a heat absorber for cooling the ventilation air.

Here, unlike the first embodiment, when a predetermined condition is satisfied during the cooling mode in the second embodiment, the heat source cooperation mode is employed and the ventilation air having been cooled in the inside evaporator 20 is reheated in the heater core 32 to adjust the blowing temperature.

Specifically, in the second embodiment, the predetermined condition may be a case in which the target blowing temperature TAO in the cooling mode is higher than a blowing temperature that is adjustable by the cycle (i.e., the target blowing temperature TAO is about the outside air temperature Tam). In this case, the heater core 32 needs to heat the ventilation air to adjust the temperature of the ventilation air to be the target blowing temperature TAO.

Thus, during the cooling mode in the second embodiment, the heat source cooperation mode in which both the refrigerant cycle device 10 and the heat medium heater 31 are cooperated as a cooling heat source is employed and the vehicle air conditioner 1 adjusts the temperature of the ventilation air to be the target blowing temperature TAO by controlling the heating amount of the heat medium heater 31.

The heating mode in the second embodiment is executed when the outside air temperature Tam is equal to or less than the operation lowest outside temperature Tam1 as with in the first embodiment. In this case, since the refrigerant cycle device 10 cannot be used as a heating source also in the second embodiment, the heat medium temperature TW is adjusted to reach the target heat medium temperature TWO by controlling the heating amount of the heat medium heater 31.

As described above, according to the vehicle air conditioner 1 in the second embodiment, operational effects exerted by the configurations common with the first embodiment can be obtained similar to the first embodiment.

In particular, according to the vehicle air conditioner 1 in the second embodiment, when a simple configuration to achieve the cooling mode and the heating mode is employed as a configuration of the refrigerant cycle device 10, the heat source cooperation mode using both the refrigerant cycle device 10 and the heat medium heater 31 can be employed.

Thus, the vehicle air conditioner 1 can suppress the fluctuations in the blowing temperature and improve the heating efficiency by utilizing the multiple heat sources of the refrigerant cycle device 10 and the heat medium heater 31.

The present disclosure is not limited to the embodiments described above, and various modifications can be made as follows within a scope not departing from the spirit of the present disclosure.

In the embodiments described above, the air conditioner is applied to the vehicle air conditioner, but the present disclosure is not limited to this configuration. Various configurations can be applied while the air conditioner includes the refrigerant cycle device 10 and the heat medium circuit 30.

In addition, the refrigerant cycle device 10 configuring the air conditioner is not limited to the configurations described above and may be variously altered.

The configuration of the heat medium circuit is not limited to the configurations in the embodiments described above. For example, other configurations may be added to the heat medium circuit 30. For example, a radiator for releasing heat of the heat medium to the outside air may be added to the heat medium circuit 30 and the radiator may be connected in parallel with the heater core 32.

A heat generating device that generates heat while being operated may be added to the heat medium circuit 30 as other configuration added to the heat medium circuit 30. For example, in the electric motor, the heat generating device may be an inverter or a motor generator.

In the embodiments described above, the target heat medium temperature TWO and the heat medium temperature TW are used as indexes for controlling the heating amount of the heat medium heater 31, but the present disclosure is not limited to this configuration. For example, the heating amount of the heat medium heater 31 may be controlled with the blowing temperature TAV and the target blowing temperature TAO relating to the blowing air that is to be blown into the vehicle cabin.

Although the present disclosure has been described in accordance with the embodiments, it is understood that the present disclosure is not limited to the embodiments and structures disclosed therein. The present disclosure also includes various modifications and variations within an equivalent range. In addition, while the various combinations and configurations, which are preferred, other combinations and configurations, including more, less or only a single element, are also within the spirit and scope of the present disclosure.

What is claimed is:

1. An air-conditioner comprising:
a heat medium circuit including:
a heating heat exchanger configured to exchange heat between a heat medium and a ventilation air to be blown to an air-conditioning target space; and
an electric heater configured to heat the heat medium;
a refrigerant cycle device configured to heat the heat medium in the heat medium circuit by exchanging heat between the heat medium and a high-temperature high-pressure refrigerant discharged from an electric compressor;
a discharge capacity controlling section configured to control a rotational speed of the electric compressor;
a heat generation amount controlling section configured to control a heating amount generated by the electric heater;
a target temperature determining section configured to determine a target temperature of the heat medium to flow into the heating heat exchanger; and
an upper limit determining section configured to determine an upper limit of the rotational speed of the electric compressor, wherein
a difference calculated by subtracting a current temperature of the heat medium to be flown into the heating heat exchanger from the target temperature is defined as a temperature difference,
a difference calculated by subtracting a current rotational speed of the electric compressor from the upper limit is defined as a capacity difference,
the air conditioner is configured to selectively switch between a heater priority mode and a compressor priority mode,
during the heater priority mode, the discharge capacity controlling section is configured to increase the rotational speed to reach the upper limit and the heat generation amount controlling section is configured to increase the heating amount as the temperature difference increases, and
during the compressor priority mode, the heat generation amount controlling section is configured to decrease the heating amount generated by the electric heater by a decreasing amount and the discharge capacity controlling section is configured to increase the rotational speed of the electric compressor to compensate for the decreasing amount decreased by the heat generation amount controlling section.

2. The air conditioner according to claim 1, wherein during the compressor priority mode, the heat generation amount controlling section is configured to determine the decreasing amount such that the decreasing amount decreases as the temperature difference increases.

3. The air conditioner according to claim 1, wherein the heater priority mode is switched to the compressor priority mode when the capacity difference is equal to or greater than a standard capacity difference during the heater priority mode.

4. The air conditioner according to claim 1, wherein the heater priority mode is switched to the compressor priority mode when the heating amount generated by the electric heater is equal to or less than a standard value during the heater priority mode.

5. The air conditioner according to claim 1, wherein
the compressor priority mode is switched to the heater priority mode when the capacity difference is equal to or less than a specified capacity difference and when the temperature difference is equal to or greater than a predetermined value during the compressor priority mode.

6. The air conditioner according to claim 1, wherein
the discharge capacity controlling section is configured to increase the rotational speed of the electric compressor as the temperature difference increases and the heat generation amount controlling section is configured to increase the heating amount generated by the electric heater as the temperature difference increases during a combination use mode when the temperature difference is equal to or greater than a specified temperature difference.

7. The air conditioner according to claim 6, wherein
the combination use mode is switched to the compressor priority mode when the temperature difference is equal to or less than a standard temperature difference during the combination use mode.

8. The air conditioner according to claim 6, wherein
the combination use mode is switched to the heater priority mode when the capacity difference is equal to or less than a specified capacity difference during the combination use mode.

9. The air conditioner according to claim 1, wherein
the electric heater stops to heat the heat medium and the compressor is operated during a compressor single use mode when at least an outside air temperature is equal to or greater than a standard outside air temperature.

10. The air conditioner according to claim 1, wherein
the electric compressor is stopped to be operated and the electric heater heats the heat medium during a heater single use mode when an outside air temperature is equal to or less than an operation lowest outside temperature.

11. An air-conditioner comprising:
a heat medium circuit including:
  a heating heat exchanger configured to exchange heat between a heat medium and a ventilation air to be blown to an air-conditioning target space; and
  an electric heater configured to heat the heat medium;
a refrigerant cycle configured to heat the heat medium in the heat medium circuit by exchanging heat between the heat medium and a high-temperature high-pressure refrigerant discharged from an electric compressor; and
a processor programmed to:
  determine a target temperature of the heat medium to flow into the heating heat exchanger;
  determine an upper limit of the rotational speed of the electric compressor;
  control a rotational speed of the electric compressor and a heating amount generated by the electric heater;
  switch an operating mode of the air-conditioner between a heater priority mode and a compressor priority mode, wherein
a difference calculated by subtracting a current temperature of the heat medium to be flown into the heating heat exchanger from the target temperature is defined as a temperature difference,
a difference calculated by subtracting a current rotational speed of the electric compressor from the upper limit is defined as a capacity difference,
during the heater priority mode, the processor is further programmed to:
  increase the rotational speed to reach the upper limit; and
  increase the heating amount as the temperature difference increases, and
during the compressor priority mode, the processor is further programmed to:
  decrease the heating amount generated by the electric heater by a decreasing amount; and
  increase the rotational speed of the electric compressor to compensate for the decreasing amount.

12. The air conditioner according to claim 11, wherein
during the compressor priority mode, the processor is further programmed to determine the decreasing amount such that the decreasing amount decreases as the temperature difference increases.

13. The air conditioner according to claim 11, wherein
the processor is further programmed to:
  determine whether the capacity difference is equal to or greater than a standard capacity difference during the heater priority mode; and
  switch the heater priority mode to the compressor priority mode upon determining that the capacity difference is equal to or greater than the standard capacity difference during the heater priority mode.

14. The air conditioner according to claim 11, wherein
the processor is further programmed to:
  determine whether the heating amount generated by the electric heater is equal to or less than a standard value during the heater priority mode; and
  switch the heater priority mode to the compressor priority mode upon determining that the heating amount generated by the electric heater is equal to or less than the standard value during the heater priority mode.

15. The air conditioner according to claim 11, wherein
the processor is further programmed to:
  determine whether the capacity difference is equal to or less than a specified capacity difference and whether the temperature difference is equal to or greater than a predetermined value during the compressor priority mode; and
  switch the compressor priority mode to the heater priority mode upon determining that the capacity difference is equal to or less than the specified capacity difference and that the temperature difference is equal to or greater than the predetermined value during the compressor priority mode.

16. The air conditioner according to claim 11, wherein
the processor is further programmed to:
  determine whether the temperature difference is equal to or greater than a specified temperature difference; and
  increase the rotational speed of the electric compressor as the temperature difference increases and increase the heating amount generated by the electric heater as the temperature difference increases during a combination use mode upon determining that the temperature difference is equal to or greater than the specified temperature difference.

17. The air conditioner according to claim 16, wherein the processor is further programmed to:
- determine whether the temperature difference is equal to or less than a standard temperature difference during the combination use mode, the standard temperature difference being less than the specified temperature difference; and
- switch the combination use mode to the compressor priority mode upon determining the temperature difference is equal to or less than the standard temperature difference during the combination use mode.

18. The air conditioner according to claim 16, wherein the processor is further programmed to:
- determine whether the capacity difference is equal to or less than a specified capacity difference during the combination use mode; and
- switch the combination use mode to the heater priority mode upon determining that the capacity difference is equal to or less than the specified capacity difference during the combination use mode.

19. The air conditioner according to claim 11, wherein the processor is further programmed to:
- determine whether at least an outside air temperature is equal to or greater than a standard outside air temperature; and
- stop the electric heater to heat the heat medium and operate the compressor during a compressor single use mode upon determining the at least the outside air temperature is equal to or greater than the standard outside air temperature.

20. The air conditioner according to claim 11, wherein the processor is further programmed to:
- determine whether an outside air temperature is equal to or less than an operation lowest outside temperature; and
- stop the electric compressor and operate the electric heater to heat the heat medium during a heater single use mode upon determining that the outside air temperature is equal to or less than the operation lowest outside temperature.

* * * * *